United States Patent
Jitaru

(10) Patent No.: US 11,165,360 B2
(45) Date of Patent: *Nov. 2, 2021

(54) SELF-ADJUSTING CURRENT INJECTION TECHNOLOGY

(71) Applicant: Rompower Technology Holdings, LLC, Milford, DE (US)

(72) Inventor: Ionel Jitaru, Tucson, AZ (US)

(73) Assignee: Rompower Technology Holdings, LLC, Milford, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/751,747

(22) Filed: Jan. 24, 2020

(65) Prior Publication Data

US 2021/0006170 A1 Jan. 7, 2021

Related U.S. Application Data

(63) Continuation of application No. 16/503,432, filed on Jul. 3, 2019, now Pat. No. 10,574,148.

(51) Int. Cl.
*H02M 3/335* (2006.01)
*H02M 7/217* (2006.01)
*H02M 1/00* (2006.01)

(52) U.S. Cl.
CPC ..... *H02M 3/33592* (2013.01); *H02M 1/0061* (2013.01); *H02M 7/217* (2013.01);
(Continued)

(58) Field of Classification Search
CPC ..... H02M 2001/0058; H02M 3/33592; H02M 3/33576
See application file for complete search history.

(56) References Cited

U.S. PATENT DOCUMENTS 5,231,563 A  7/1993  Jitaru
5,477,131 A *  12/1995  Gegner ............. H02M 3/158
                                                  323/222
(Continued)

FOREIGN PATENT DOCUMENTS

WO    2019099708 A1    5/2019

OTHER PUBLICATIONS

Henry Shu-Hung Chung, Hui and Wang; A Zer-Current-Switching PWM Flyback Converter with a Simple Auxiliary Switch; IEEE Transactions on Power Electronics, vol. 14, No. 2, Mar. 1999; pp. 329-342. (Year: 1999).*

(Continued)

*Primary Examiner* — Harry R Behm
(74) *Attorney, Agent, or Firm* — Thomas W. Galvani, P.C.; Thomas W. Galvani

(57) ABSTRACT

A method includes providing a transformer with primary and current injection windings, a primary switch connected to the primary winding, a parasitic capacitance reflected across the primary switch, a secondary rectifier means, and a current injection circuit including a current injection switch connected to the current injection winding, and a unidirectional current injection switch connected to the current injection winding. The method includes switching on the current injection switch to start a current injection flowing from a controlled voltage source, through the unidirectional current injection switch and further through the current injection winding. The current injection reflects into the primary winding, thereby discharging the parasitic capacitance reflected across the primary switch. The method includes turning on the primary switch with a delay time after the current injection switch turns on and turning off the current injection switch after the current injection reaches zero amplitude.

29 Claims, 21 Drawing Sheets

(52) U.S. Cl.
CPC ........ *H02M 1/0003* (2021.05); *H02M 1/0058* (2021.05); *H02M 3/33576* (2013.01)

(56) References Cited

U.S. PATENT DOCUMENTS

| | | | | |
|---|---|---|---|---|
| 6,018,469 | A * | 1/2000 | Poon | H02M 3/158 363/20 |
| 6,862,195 | B2 | 3/2005 | Jitaru | |
| 7,009,850 | B2 | 3/2006 | Jitaru | |
| 7,375,984 | B2 | 5/2008 | Keung | |
| 7,450,402 | B2 | 11/2008 | Jitaru | |
| 7,548,435 | B2 | 6/2009 | Mao | |
| 7,869,237 | B1 * | 1/2011 | Schutten | H02M 3/33569 363/132 |
| 9,136,757 | B2 * | 9/2015 | Arisawa | H02M 1/44 |
| 9,391,506 | B2 * | 7/2016 | Jeong | H02M 1/4225 |
| 9,899,928 | B2 | 2/2018 | Handa et al. | |
| 9,899,929 | B2 | 2/2018 | Jitaru et al. | |
| 9,985,546 | B2 | 5/2018 | Jitaru | |
| 10,050,545 | B2 | 8/2018 | Jitaru | |
| 10,103,639 | B2 | 10/2018 | Jitaru et al. | |
| 10,291,140 | B2 | 5/2019 | Jitaru | |
| 2005/0226012 | A1 * | 10/2005 | Jovanovic | H02M 3/1584 363/59 |
| 2007/0230228 | A1 | 10/2007 | Mao | |
| 2017/0012547 | A1 | 1/2017 | Jitaru | |
| 2018/0198374 | A1 | 7/2018 | Jitaru | |
| 2018/0278169 | A1 | 9/2018 | Jitaru | |

OTHER PUBLICATIONS

Adbi, E., and Farzanehfard, H., New Zero Voltage Switching PWM Flyback Converter, IEEE—First Power Electronic & Drive Systems & Technologies Conference, pp. 196-200.

* cited by examiner $V_y = V_{in} - (V_{inj+} - V_{inj-})$

SELF-ADJUSTING CURRENT INJECTION TECHNOLOGY

CROSS-REFERENCE TO RELATED APPLICATIONS

This application is a continuation of prior U.S. patent application Ser. No. 16/503,432, filed Jul. 3, 2019, which is hereby incorporated by reference.

FIELD

The present invention relates to electrical apparatus and more specifically to DC-DC and AC-DC converters.

BACKGROUND

Most conventional DC-DC and AC-DC converters have a transformer with primary and secondary switching elements, wherein the isolation from the primary winding and secondary winding creates the separation between primary and secondary. To improve the efficiency of such converters, engineers looked for solutions to obtain zero voltage switching across the primary switches at "turn on" and to ensure that the current through the rectifier means connected to the windings, reach zero before the rectifier means turn off. In this context, rectifier generally identifies electronic devices which are designed to conduct current in a unidirectional way; those devices can be diodes, or controlled MOSFETS which do emulate the function of a diode, referred to in the power conversion field as synchronous rectifiers.

Another practice includes "true soft switching". In a "true soft switching" converter the primary switching elements turn on at zero voltage switching conditions and the rectifier means turn off at zero current. In a "true soft switching" converter, there is no ringing or spiking across any of the switching elements.

In the last 30 years, there have been many solutions developed to ensure zero voltage switching across the primary switches. Many such solutions require additional components and, in most cases, still lead to an increase in conduction losses. This includes full bridge topologies used in higher power applications which do obtain zero voltage switching for the switching element, such as U.S. Pat. Nos. 5,231,563 and 6,862,195, 7,009,850.

All these technologies do offer zero voltage switching under certain conditions across the primary switching elements but they do not always create zero current at turn off for the rectifier means.

Resonant topologies that became very popular in the last ten years shape the current through the switching elements in a half sinusoidal shape in order to create conditions for zero voltage switching in primary and sometime zero current switching through the secondary rectifier means. Shaping the current from rectangular shape to half sinusoidal shape does increase the root mean square ("RMS") current and as a result increases the conduction losses. In addition, in resonant topologies, the modulation of output power is done through modulation in frequency which in some applications is not acceptable.

In conventional constant frequency pulse width modulation ("PWM") topologies, there are solutions to obtain zero voltage switching in the primary and even zero current switching through the rectifier means (such as presented in U.S. Pat. No. 10,103,639). However, in these topologies, there were some penalties such as an increase in conduction losses and some restriction of the input voltage range and output current range.

In addition, many of these solutions apply to specific topologies. Such is the case in U.S. Pat. No. 9,985,546 for full bridge topologies, U.S. Pat. No. 9,899,928 for half bridge and full bridge topologies, and U.S. Pat. No. 7,450,402 for flyback topology.

SUMMARY

The solutions presented in this disclosure apply to any topology, isolated or non-isolated topologies, and are self-adjusting solutions which reduce the level of control complexity and maximize efficiency. They eliminate the power dissipation due to switching losses in hard switching and convert any hard switching converter into soft switching converter wherein all the switching elements are turning on at zero voltage and the current through the rectifier means reaches zero before the rectifier means turn off. Embodiments of the solutions may be referred to herein as Rompower Current Injection Technology or "RCIT". Using RCIT, any topology may be converted into a "true soft switching topology". This solution works not only on all the topologies but also in any mode of operation of said topologies, moreover, it works for any topology operating in continuous or discontinuous mode. A continuous mode operation means that the current through the storage inductive element does not reach zero and discontinuous mode of operation means that the current through the storage inductive element does reach zero at each cycle. The storage inductive element can be a discrete inductor; such is the case in two transistor forward topology or full and half bridge topologies. The storage inductive element can also be the magnetizing inductance of a transformer as is the case of a flyback topology.

Embodiments of this RCIT address the problem that continues to persist in the art, specifically the problem of zero voltage switching across the primary switches and zero current at turn off through the rectifier means. RCIT accomplishes this in any operating condition wherein the amplitude of current injection self-adjusts in order to obtain these conditions. The proposed solutions increase the efficiency of the converters in which RCIT is implemented, thereby causing a decrease of the heat and as a result creating conditions for a much higher power density. Using RCIT any topology may be converted into a "true soft switching" topology. The embodiments proposed herein work for any topology operating in continuous or discontinuous mode.

Using RCIT, a person skilled in the art can convert any conventional hard switching topology in a "true soft switching" topology. Though this disclosure makes reference to just few of the topologies such as flyback, continuous and discontinuous mode, full bridge and boost topology, the embodiments of RCIT apply to any topology, and application to any and all topologies is suitably considered to be within the scope of the disclosure herein.

An embodiment of a method includes providing a DC-DC converter having a main switch, a transformer having a primary winding and a current injection winding, wherein a leakage inductance is formed between the primary winding and the current injection winding. The method includes providing an input voltage source, a primary switch connected to the primary winding, a parasitic capacitance reflected across the primary switch, a secondary rectifier means connected to the primary winding, and a current injection circuit including a current injection switch connected to a first terminal of the current injection winding, and a unidirectional current injection switch connected to a second terminal of the current injection winding, wherein the second terminal is not connected to the current injection switch. A controlled voltage source is connected to the unidirectional current injection switch and to the current injection switch at an end of the current injection switch which is not connected to the current injection winding. The method includes switching on the current injection switch so as to start a current injection flowing from the controlled voltage source, through the unidirectional current injection switch and further through the current injection winding, wherein the current injection reflects into the primary winding with an amplitude proportional to a turn ratio of the current injection winding to the primary winding. The method includes the current injection reflected into the primary winding discharging the parasitic capacitance reflected across the primary switch, turning on the primary switch with a delay time after the current injection switch turns on, and turning off the current injection switch after the current injection reaches zero amplitude. In an embodiment, the delay time is sufficient for the primary switch to turn on at a predetermined voltage level. In an embodiment, the predetermined voltage level is zero. In an embodiment, the controlled voltage source has a level which is sufficient for the primary switch to turn on at a predetermined voltage level. In an embodiment, the predetermined voltage level is zero. In an embodiment, the current injection switch is turned on in a valley of a voltage level during ringing across the primary switch, so as to create zero voltage switching conditions for the main switch with minimum energy consumption. In an embodiment, the current injection circuit is part of one of a flyback topology, boost topology, and buck topology. In an embodiment, the boost topology is used in a power factor correction circuit.

An embodiment of a method includes providing a DC-DC converter having a main switch and a transformer with a primary winding and a current injection winding, wherein a leakage inductance is formed between the primary winding and the current injection winding. The method includes providing an input voltage source, a primary switch connected to the primary winding, a parasitic capacitance reflected across the primary switch, a secondary rectifier means connected to the primary winding, and a current injection circuit including a current injection switch connected to a first terminal of the current injection winding, and a unidirectional current injection switch connected to a second terminal of the current injection winding, wherein the second terminal is not connected to the current injection switch. A controlled voltage source is connected to the unidirectional current injection switch and to the current injection switch at an end of the current injection switch which is not connected to the current injection winding. A current injection capacitor is connected between the unidirectional current injection switch and the controlled voltage source. The method includes switching on the current injection switch, so as to start a current injection flowing from the controlled voltage source, through the unidirectional current injection switch and further through the current injection winding, wherein the current injection reflects into the primary winding with an amplitude proportional to a turn ratio of the current injection winding to the primary winding. The method includes the current injection reflected into the primary winding discharging the parasitic capacitance reflected across the primary switch, turning on the primary switch with a delay time after the current injection switch turns on, and turning off the current injection switch after the current injection becomes negative and before it reaches zero amplitude. In an embodiment, the delay time is sufficient for the primary switch to turn on at a predetermined voltage level. In an embodiment, the predetermined voltage level is zero. In an embodiment, the controlled voltage source has a level which is sufficient for the primary switch to turn on at a predetermined voltage level. In an embodiment, the predetermined voltage level is zero. In an embodiment, the current injection switch is turned on in a valley of a voltage level during ringing across the primary switch, so as to create zero voltage switching conditions for the main switch with minimum energy consumption. In an embodiment, the current injection circuit is part of one of a flyback topology, boost topology, and buck topology. In an embodiment, the boost topology is used in power factor correction circuit.

An embodiment of a method includes providing a DC-DC converter having a main switch, and a transformer with a primary winding and a current injection winding, wherein a leakage inductance is formed between the primary winding and the current injection winding. The method includes providing an input voltage source, a primary switch connected to the primary winding, a parasitic capacitance reflected across the primary switch, a secondary rectifier means connected to the primary winding, and a current injection circuit including a current injection switch connected to a first terminal of the current injection winding, and a unidirectional current injection switch connected to a second terminal of the current injection winding, wherein the second terminal not connected to the current injection switch. A controlled voltage source is connected to the unidirectional current injection switch and to the current injection switch at an end of the current injection switch which is not connected to the current injection winding, and a current injection capacitor is connected between the unidirectional current injection switch and the controlled voltage source. The method includes switching on the current injection switch, so as to start a current injection flowing from the controlled voltage source, through the unidirectional current injection switch and further through the current injection winding, wherein the current injection reflects into the primary winding with an amplitude proportional to a turn ratio of the current injection winding to the primary winding. The current injection reflected into the primary winding has an opposite polarity of current flowing through the rectifier means and exceeds an amplitude of the current flowing through the rectifier means. The method includes turning off the rectifier means after the current flowing through the rectifier means reaches zero, the current injection reflected into the primary winding further discharging the parasitic capacitance reflected across the primary switch, turning on the primary switch with a delay time after the current injection switch turns on, and turning off the current injection switch after the current injection becomes negative and before it reaches zero amplitude. In an embodiment, the delay time is sufficient for the primary switch to turn on at a predetermined voltage level. In an embodiment, the predetermined voltage level is zero. In an embodiment, the controlled voltage source has a level which is sufficient for the primary switch to turn on at a predetermined voltage level. In an embodiment, the predetermined voltage level is zero. In an embodiment, the current injection circuit comprises part of one of a flyback topology, boost topology, and buck topology. In an embodiment, the boost topology is used in power factor correction circuit.

An embodiment of a method includes providing a DC-DC converter having a primary side with a main switch and a secondary side, a transformer with a primary winding at the primary side and two secondary windings at the secondary side, and at least two sets, wherein each set has two current injection windings, wherein a leakage inductance is formed between the primary winding and each of the two current injection windings in each set and also between the secondary windings and each of the two current injection windings in each set. The method includes providing an input voltage source, two primary switches connected to the primary winding, a parasitic capacitance reflected across each of the two primary switches, two secondary rectifier means, each connected to a respective one of the two secondary windings, and a current injection circuit including two current injection switches in each set, each connected to a first terminal of a respective one of the two current injection windings, and two unidirectional current injection switches in each set, each connected to a second terminal of the respective one of the two current injection windings, wherein the second terminals are not connected to the current injection switches. The method further includes providing two controlled voltage sources in each set, each connected to the respective unidirectional current injection switches and to each current injection switch at ends of the current injection switches which are not connected to the current injection windings, two current injection capacitors in each set, each connected between the respective unidirectional current injection switches and the controlled voltage sources. Each current injection switch in each set has a corresponding rectifier means, wherein current injection flowing through each of the current injection switches produces induced currents in the secondary windings connected to the corresponding rectifier means of opposite polarity to currents flowing through the corresponding rectifier means. Each current injection switch in each set has a corresponding primary switch, wherein current injection flowing through each of the current injection switches produces an induced current in the primary winding connected to the corresponding primary switch of opposite polarity to the current flowing through corresponding primary switch. The method further includes switching on each of the current injection switches in each set, so as to start a current injection flowing from the controlled voltage source, through the respective unidirectional current injection switch and further through the respective current injection winding, wherein the current injection reflects into the secondary winding connected to the corresponding rectifier means with an amplitude proportional to a turn ratio of the current injection winding to the secondary winding connected to the corresponding rectifier means. The current injection reflected into the secondary winding connected to the corresponding rectifier means has an opposite polarity of current flowing through the corresponding rectifier means and exceeds the amplitude of the current flowing through the corresponding rectifier means. The method includes turning off the rectifier means after the current through the rectifier means reaches zero. The current injection further reflects into the primary winding with an amplitude proportional to a turn ratio of the current injection winding to the primary winding, and the current injection reflected into the primary winding discharges the parasitic capacitances reflected across the primary switches. The method further includes turning on the respective corresponding primary switches with a delay time after the corresponding current injection switch turns on, and turning off the current injection switches after the current injection becomes negative and before it reaches zero amplitude. In an embodiment, the delay time is sufficient for the primary switches to turn on at a predetermined voltage level. In an embodiment, the predetermined voltage level is zero. In an embodiment, the controlled voltage source has a level which is sufficient for the primary switches to turn on at a predetermined voltage level. In an embodiment, the predetermined voltage level is zero. In an embodiment, the current injection circuits comprise a part of one of a half bridge topology, full bridge topology, and two transistor forward topology.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings:

FIG. 15 plots waveforms of the circuit of FIG. 1 wherein there is a current flowing through the rectifier means when the current injection switch is turned on;

DETAILED DESCRIPTION

Figure 1:
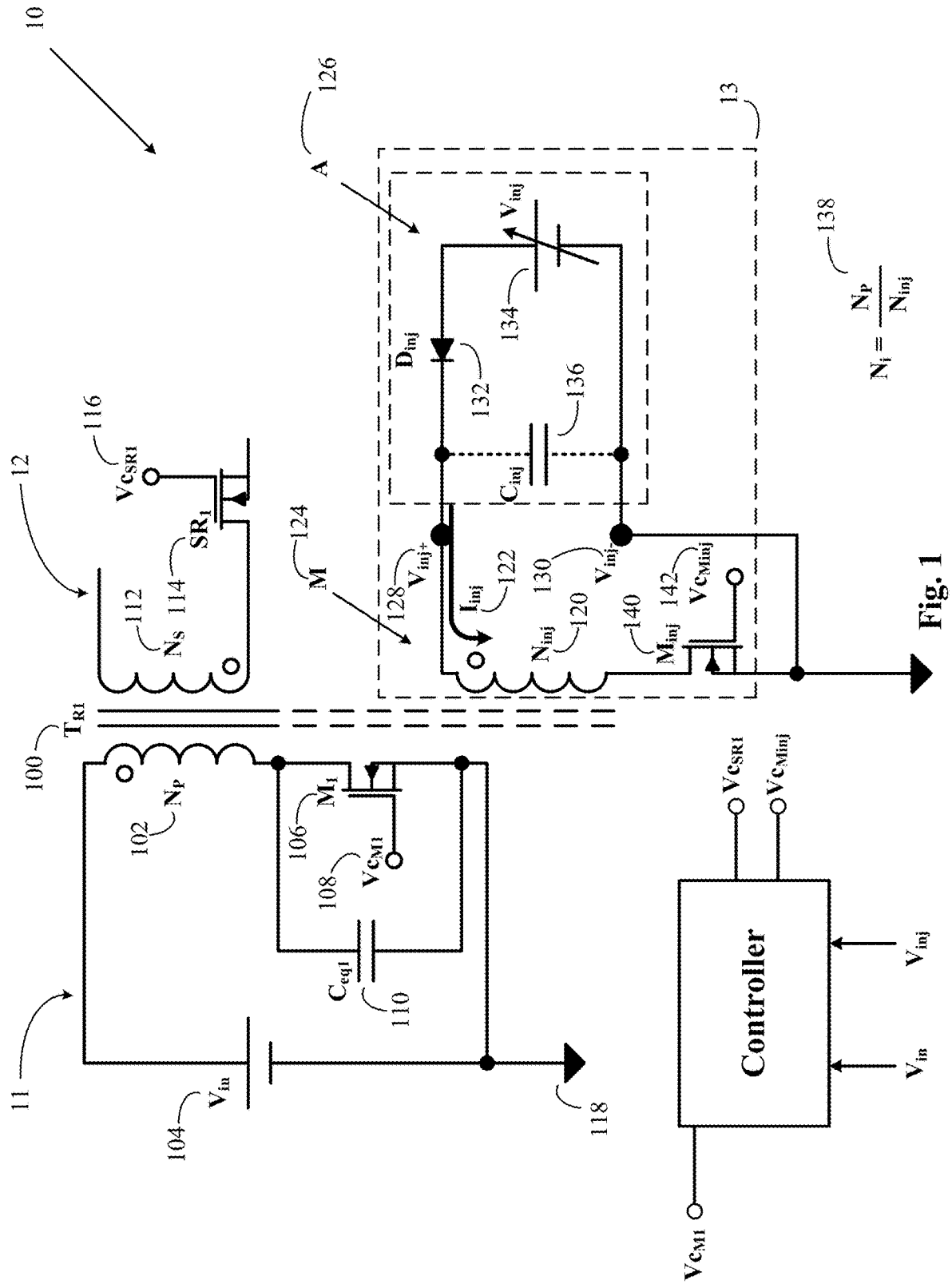
FIG. 1 is a schematic representation of a power train with a main switch in the primary and a rectifier means in the secondary using self-adjusting current injection technology, identified later as Rompower current injection technology ("RCIT")

Reference now is made to the drawings, in which the same reference characters are used throughout the different figures to designate the same elements. FIG. 1 presents a simplified schematic of a converter 10 including a primary side 11 and a secondary side 12 and at least one transformer Tr1, 100, and at least one primary winding connected to an input voltage source, Vin, 104, and at least one primary switch M1, 106, and at least one secondary winding 112, and connected to at least one rectifier means, SR1, 114. As an side, this description will sometimes refer to the full name of the circuit element (such as "primary switch," "rectifier means," etc.) and may sometimes refer to the abbreviated name corresponding to the circuit element (such as, respectively, "M1," "SR1," etc.) An auxiliary winding of said transformer Tr1, 100, referred to herein as the current injection winding 120, is connected to an auxiliary switch Minj, 140, referred in this disclosure as the current injection switch controlled by a control signal VcMinj, 142. The current injection winding 120, is connected to a sub-circuit, A, 126, via a connection Vinj+, 128. The second connection of the sub-circuit A, 126, is Vinj−, 130, and it is connected to the source of the Minj, 140. The sub-circuit, A, 126, named current injection sub-circuit, contains a controlled voltage source, Vinj, 134, and a unidirectional current injection switch represented in FIG. 1 as a diode, Dinj, 132. Within this description, Dinj, 132 is identified as a unidirectional current injection switch having a cathode and an anode. The unidirectional current injection switch can be a synchronized rectifier or a diode. The current through such device flows only in one direction from the anode to the cathode. The anode can be the source of a controlled MOSFET and the cathode can be the drain of a control MOSFET. Across Vinj$^+$, 128, and Vinj$^-$, 130, there is an optional current injection capacitor Cinj, 136. This capacitor Cinj 136 is optional. However, the presence of Cinj, may improve the performance of the current injection circuit 13 in some operation conditions. The entire current injection circuit 13 including the current injection winding, 120, the current injection switch, Minj, 140, and the current injection sub-circuit, A, 126, form the current injection circuit, M, 124.

When the current injection switch, 140 is turned on, a current, Iinj, 122, will start flowing through the current injection winding 120. This current reflects in the other windings of said transformer, Tr1, 100. In the event the other switching elements connected to the transformer windings, such as SR1, 114, are not conducting, the current will flow through the parasitic capacitance Ceq1, 110 reflected across of M1, 106, and further through the primary winding, 102 toward the dot of the primary winding. All the windings of the transformer Tr1, 100, have a dot which is placed at one of the winding terminations to identify the polarity. For example, in FIG. 1, the dot on the winding 102 is located at the winding termination connected to Vin, 104. The winding 120, referred in this application as the current injection winding has the dot placed at the winding termination connected to Vinj$^+$, 128. The winding 112 has the dot at the winding termination connected to the drain of SR1, 114. When the MOSFET M1, 106, is turned on there will be a voltage across winding 102, which is the Vin, 104, and this voltage has the positive polarity at the winding termination where the dot is placed. Voltages is induced in all the windings such as 120, and 112, with the positive polarity at the windings termination where the dot is placed.

When the current injection switch Minj, 140, is turned on a current, the current Iinj, 122, starts flowing through the winding 120 into the winding termination located at the dot. This current reflects in the rest of the windings flowing in each winding toward the winding termination located at the dot. In the winding 112, the current flows toward the drain of the SR1, 114, and in the winding 102, the reflected current injection flows toward the winding termination located at the dot as well. In the event that SR1, 114, is off, there is no current flowing through winding 112, the current flows only through winding 102 and toward the winding termination located at the dot. In the event the MOSFET M1, 106 is off, the injected current reflected into the primary winding flows via the parasitic capacitance Ceq1, 110, discharging it toward zero. In the event the current reflected into the winding 102, has the right amplitude and if the delay time δ between the turn on of Minj, 140 and turn on of M1, 106 is sufficiently large, the voltage across M1, 106, can reach zero voltage at the time wherein M1, 106 is turned on. This creates zero voltage switching conditions for M1, 106, at turn on.

Figure 2:
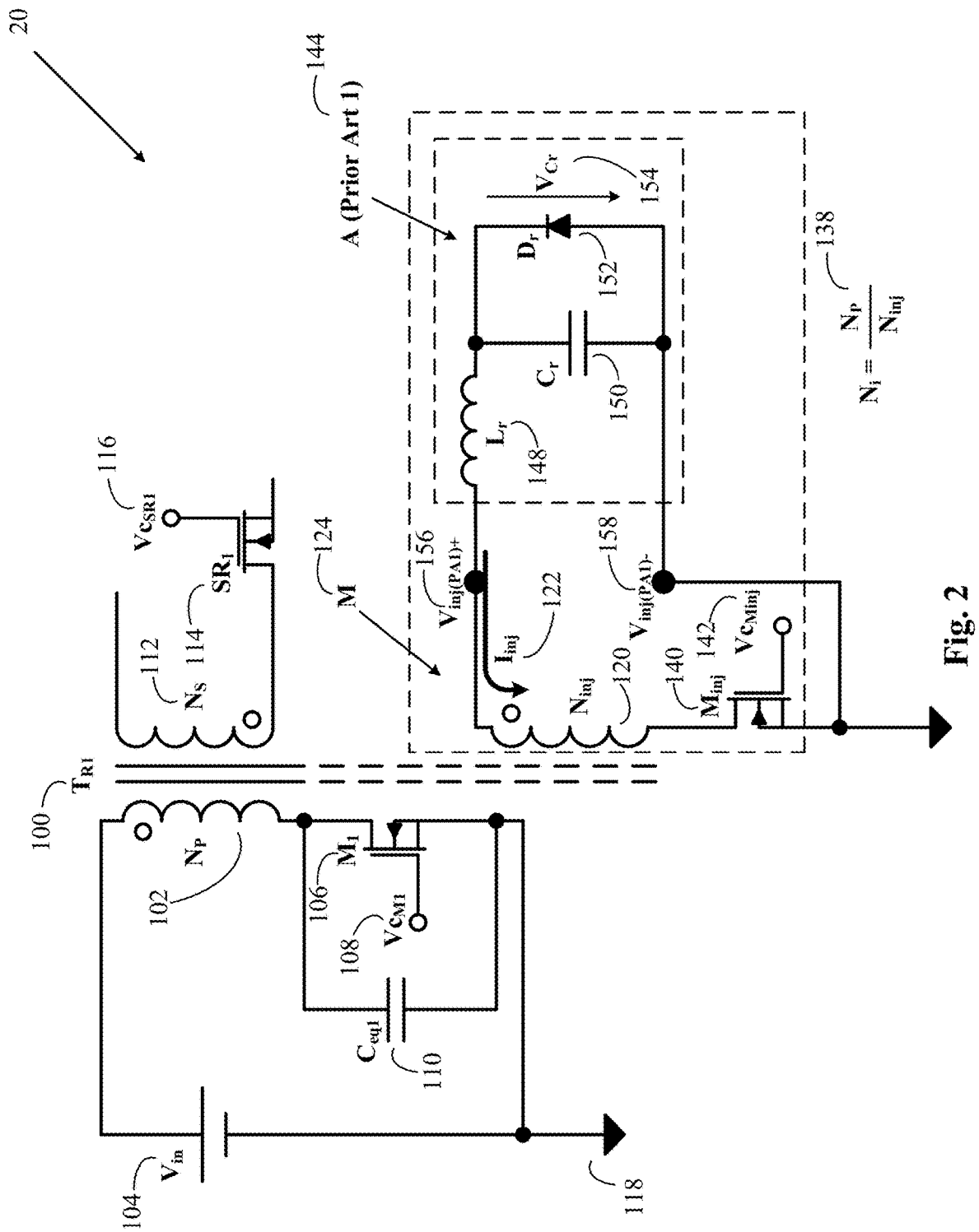
FIG. 2 is a schematic representation of a power train with a main switch in the primary and a rectifier means in the secondary which incorporates a "prior art 1" current injection circuit.
Figure 3:
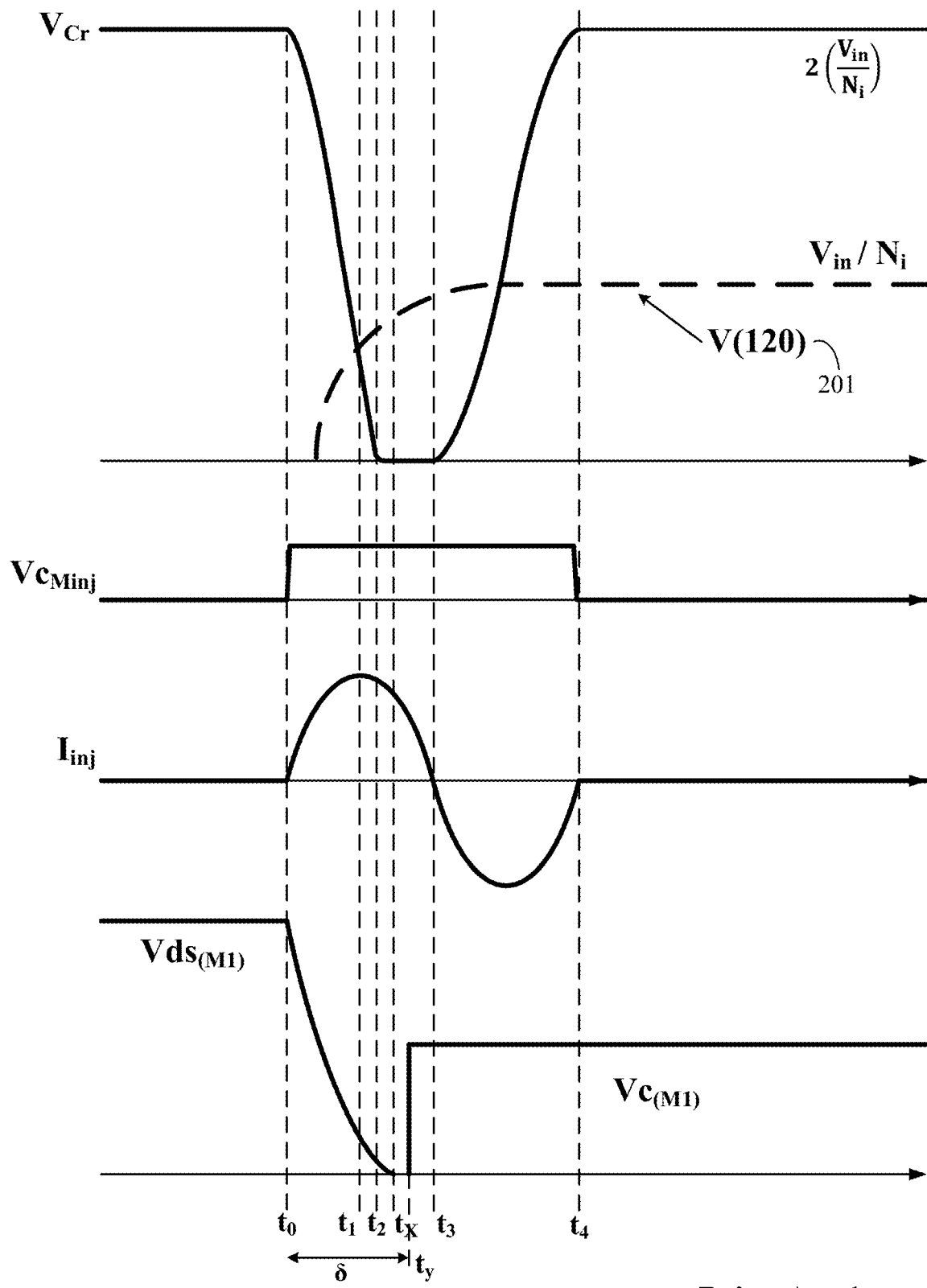
FIG. 3 plots waveforms of the power train of FIG. 2.

Briefly, two prior art configurations are now discussed. FIG. 2 depicts a converter 20 including "prior art 1," which is the current injection sub-circuit A (Prior Art 1), 144. "Prior art 1" includes a resonant capacitor Cr, 150, a diode Dr, 152, and an inductive element Lr, 148 placed in between Cr, 150 and the Vinj(PA1)+, 156. In some implementations of "prior art 1", Lr, 148 is optional. The waveforms of this "prior art 1" are depicted in FIG. 3 and include: $V_{Cr}$, which is the voltage across the capacitor Cr, 150; the voltage across the current injection winding, V(120), 201; the control signal for the current injection Minj, 140 switch, VcMinj, 142; Iinj, which is the current injection, 122, flowing through current injection winding, 120; the voltage across M1, 106, Vds (M1) and the control signal for M1, Vc(M1), 108.

At t0 the current injection switch Minj, 140 is turned on. A resonant circuit is formed by the Cr, 150 in series with the parasitic capacitance Ceq1, 110, reflected into the winding 120, leakage inductance in between the primary winding 102, and the current injection winding 120 in series with Lr, 148. This resonant circuit shapes the current injection Iinj, 122, in a sinusoidal shape and the voltage across Cr, 150 decays in a resonant manner toward zero, ultimately reaching zero level at t2. Without the diode Dr, 152, the voltage across Cr, 150, would decay even more creating a negative voltage across Cr, 150, which would boost the energy to an uncontrollable level in said resonant circuit. For that reason, the diode Dr, 152, is placed across Cr, 150, as depicted in FIG. 2, in order to prevent the voltage across Cr, 150 to become negative When the resonant current Iinj, 122, reaches zero at t3, the polarity of the resonant current changes and the voltage across Cr, 150, starts to build up to the amplitude 2*(Vin/Ni). If the diode Dr, 152, is not placed across Cr, 150, the amplitude of the voltage across Cr, 150, at t4 will be much higher and become uncontrollable. For that reason, in publications associated with "prior art 1" the diode Dr, 152, is always present. The current injection reflected into the primary winding will discharge the parasitic capacitance Ceq1, 110, toward zero. If the amplitude of Iinj is sufficient the voltage across M1, 106, will reach zero at tx as depicted in FIG. 3. During the time interval t3 to t4 the resonant capacitor Cr, 150, is recharged via the leakage inductance in between winding 102 and winding 120 in a resonant way during M1, 106, conduction.

Figure 5:
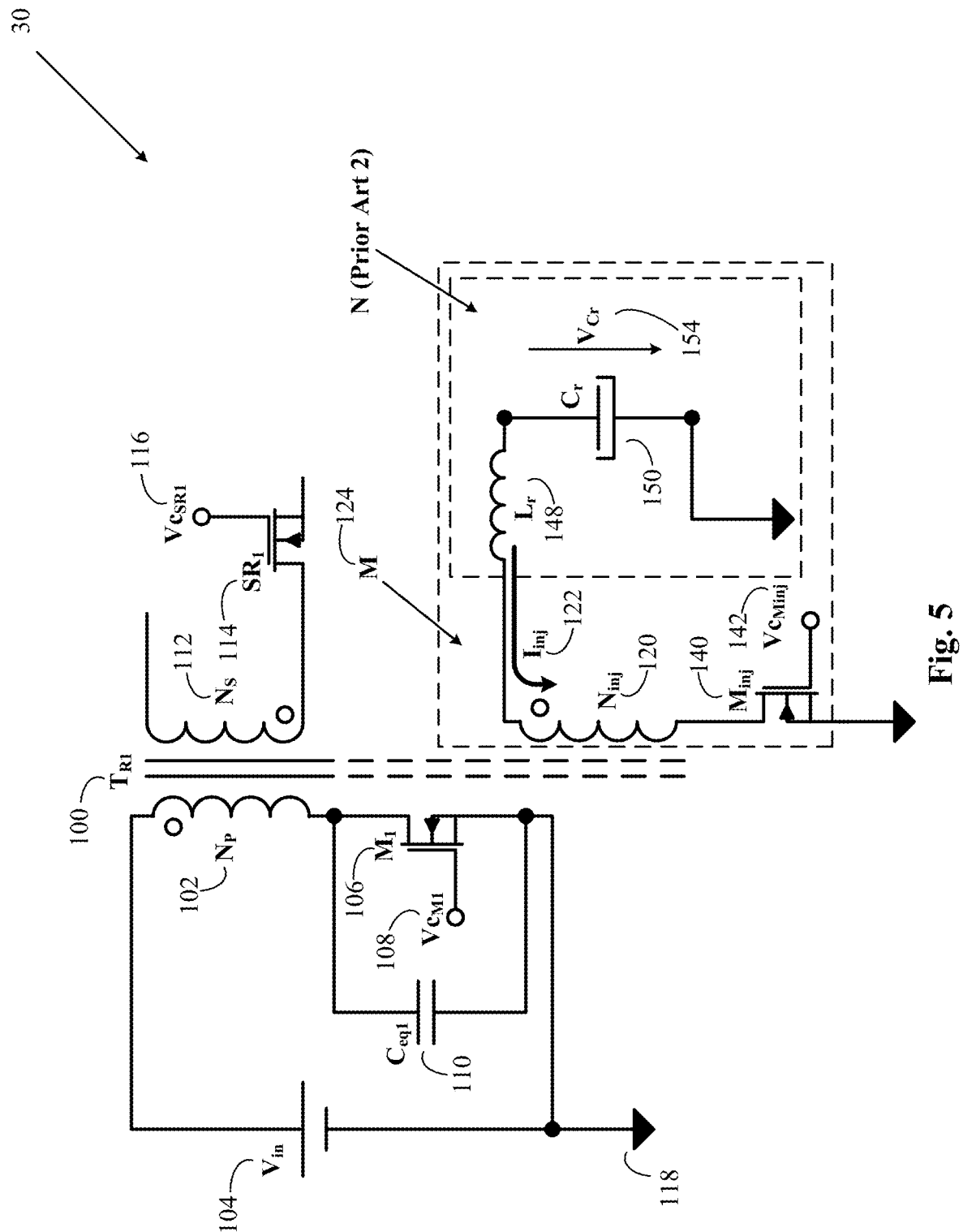
FIG. 5 is a schematic representation of a power train with a main switch in the primary and a rectifier means in the secondary which incorporates a "prior art 2" current injection circuit.
Figure 6:
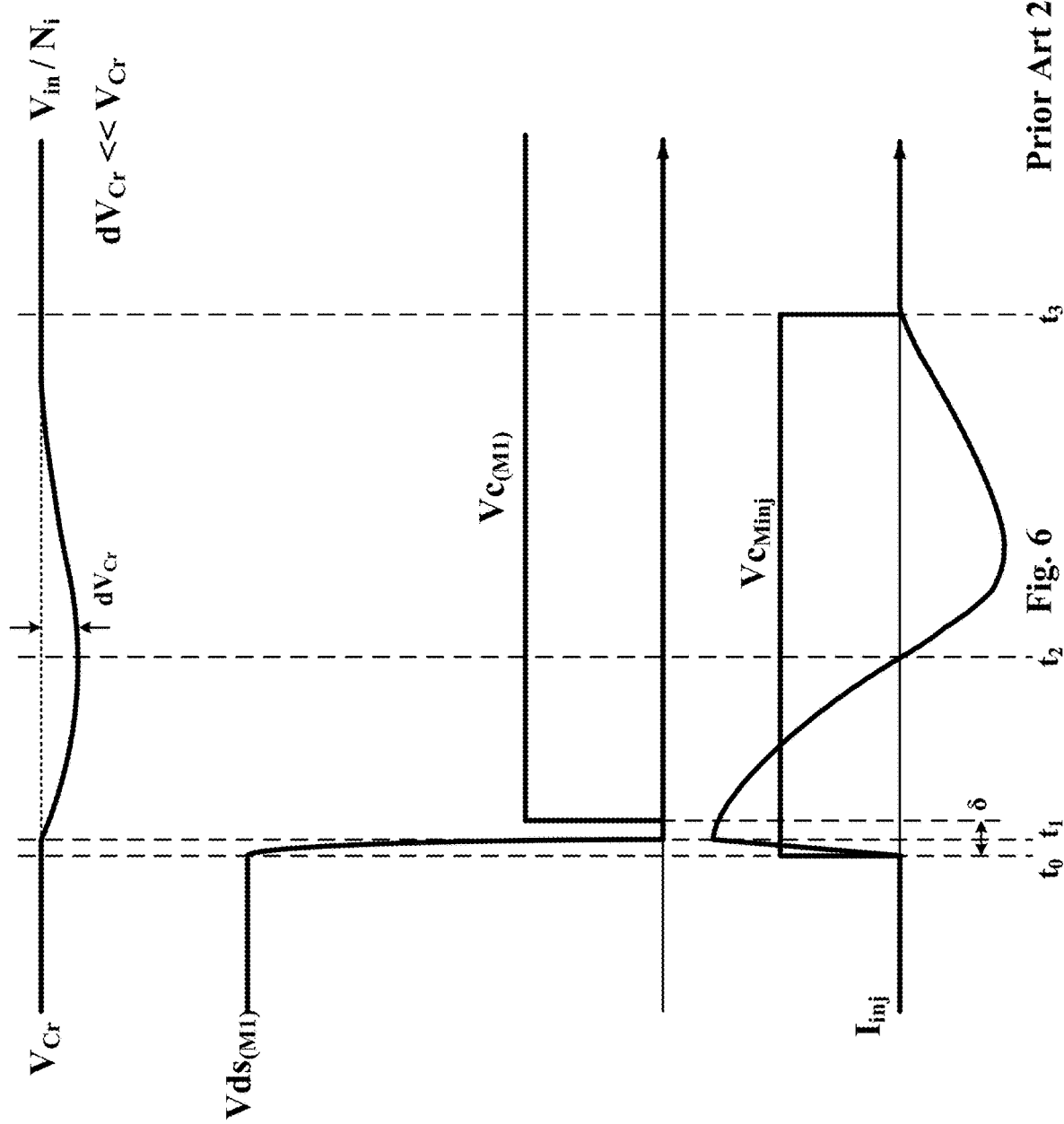
FIG. 6 plots waveforms of the power train of FIG. 5.

The "prior art 1" is presented in the IEEE publication: DOI:10.1109/PEDSTC.2010.5471832, paper entitled "New zero voltage switching PWM flyback converter." Another publication is the U.S. Pat. No. 7,548,435, by Mao entitled "Zero-voltage-switching DC-DC converters with synchronous rectifiers Next, "prior art 2" is depicted in FIG. 5 within a converter 30. FIG. 5 illustrates a converter 30 which includes, in part, the sub-circuit N (Prior Art 2). "Prior art 2" is described in the patent application "HARVESTING ENERGY FROM PARASITIC ELEMENTS OF A POWER CONVERTER", Application: PCT/US18/61333 (WO 2019099708). The capacitor Cr, 150, has a value much higher than Ceq1, 110, reflected into the current injection winding, $C_{eq1}*N_i^2 \ll C_r$, at least one order of magnitude higher. The value of Cr, 150, is chosen in such a way that the ripple across Cr, 150, during operation is much smaller than the average voltage across Cr, 150, like ten times. Waveforms are presented in FIG. 6 and include: Vcr, which is the voltage across Cr, 150; the voltage across M1, 106, which is $Vds_{M1}$, the control signal for M1, which is $Vc_{M1}$; the Iinj current flowing through the winding 120, during the conduction of Minj, 140, and the control signal for $Vc_{Minj}$.

At t0 the current injection switch Minj, 140, is turned on. The current, Iinj, ramps up from t0 to t1. At t1 the voltage across Cr, 150, is equal to the voltage across the current injection winding, 120, both of them have a voltage of Vin/Ni. At that point the current injection reaches its peak and stops increasing. The voltage across the current injection winding becomes Vin/Ni when the voltage across the primary switch M1, 106, reaches zero. The current injection reaches its peak at the time the voltage across M1, 106 reaches zero. In this way, the current injection self-adjusts. For example, in the case wherein the parasitic capacitance Ceq1, 110, changes because of the tolerances of the devices whose parasitic capacitance reflect across M1, 106, the current injection amplitude self-adjusts. For example, if the parasitic capacitance Ceq1, 110 reflected across M1, 106 is higher, the current injection amplitude will increase because the current will continue to increase until the voltage across M1, 106, reaches zero, and the longer it takes, the larger the amplitude of Iinj will become. In the other case, wherein the parasitic capacitance reflected across M1, 106, decreases, the voltage across M1, 106 will reach zero earlier and the amplitude of the current injection, Iinj, will decrease.

There is also a control mechanism to ensure that the voltage across the primary switch M1, 106, reaches zero before the primary switch turns on. For example, if the parasitic capacitance Ceq1, 110, is too large, by shifting the VcMinj ahead in time which increases 6, the current injection will be built up ahead of time and it will discharge Ceq1, 110, to zero before the primary switch M1, 106, turns on.

Figure 4:
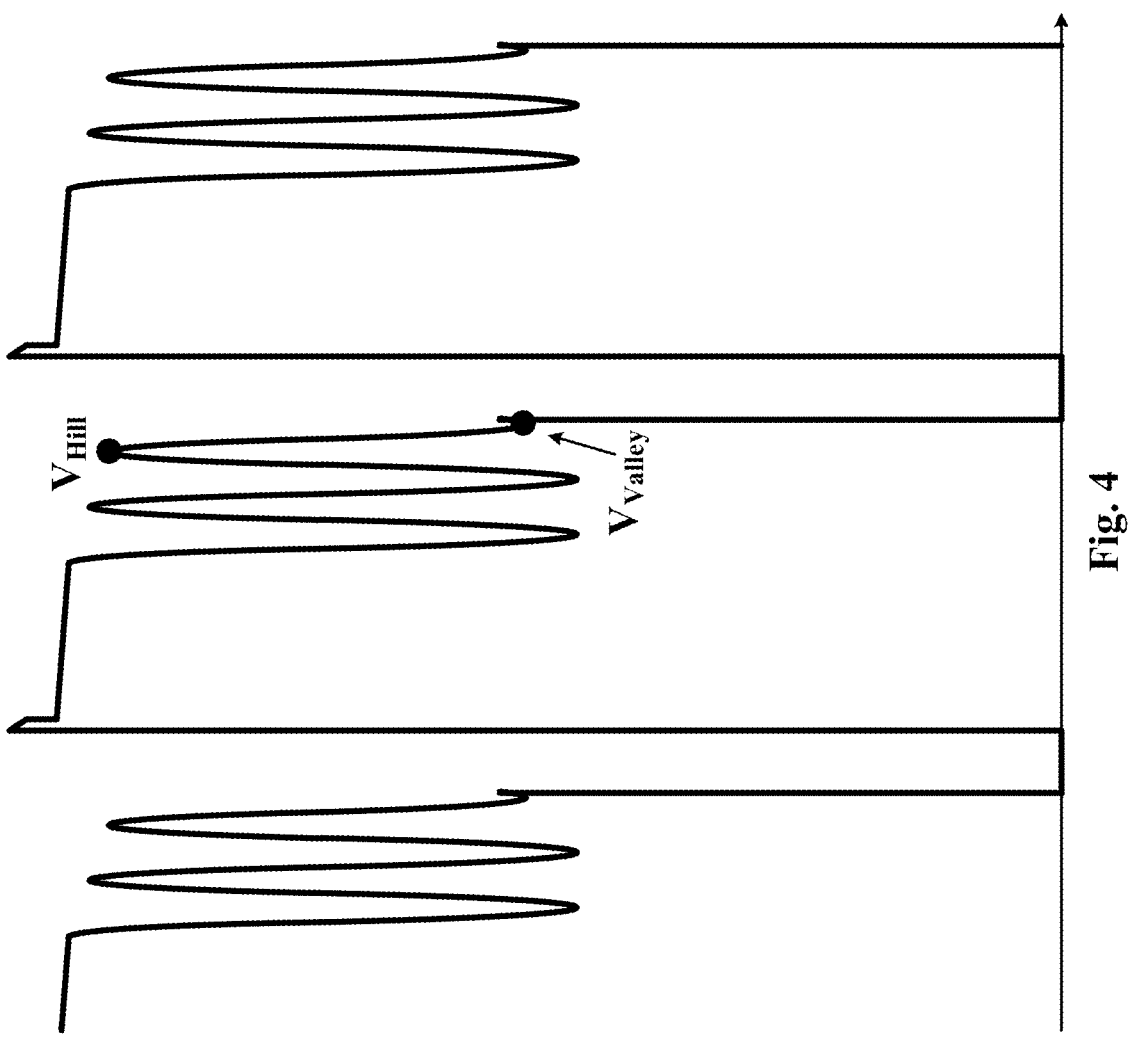
FIG. 4 plots voltage across the main switch in topologies which have a dead time such as flyback topology, boost topology and buck topology, operating in discontinuous mode.

When the voltage across M1, 106, experiences variation of amplitude as depicted in FIG. 4, the current injection will self-adjust and it will ensure that the voltage across M1, 106, will reach zero before its amplitude starts to decrease. For example, if the voltage across M1, 106, is lower at the time when Minj, 140, turns on, the voltage across the parasitic capacitance Ceq1, 110, will decay faster to zero and as a result the amplitude of Iinj will be smaller and that will decrease the power dissipation in the current injection circuit M 124, increasing the efficiency of the converter. In such applications such as discontinuous mode flyback or discontinuous mode buck or boost the current injection shall be timed to be at the valley in order to minimize the energy required by the current injection to discharge the parasitic capacitance across the primary switch. The self-adjusting feature of RCIT is one advantage in such applications. In order to reduce the switching losses in the hard switching flyback, boost and buck converters operating in discontinuous mode control ICs were developed to identify the valley and to turn on the primary switch at the valley. A very efficient converter operating in discontinuous mode would use RCIT in conjunction with the valley detection feature of these control ICs to turn on the current injection switch at the valley, creating zero voltage switching conditions for the primary switch with minimum energy consumption. Due to the self-adjusting feature of RCIT, voltage switching for the primary switch can be accomplished with minimum energy. Such current injection synchronized with the valley has proven experimentally to obtain the highest efficiency operation in comparison to any other zero voltage switching solutions.

Figure 7:
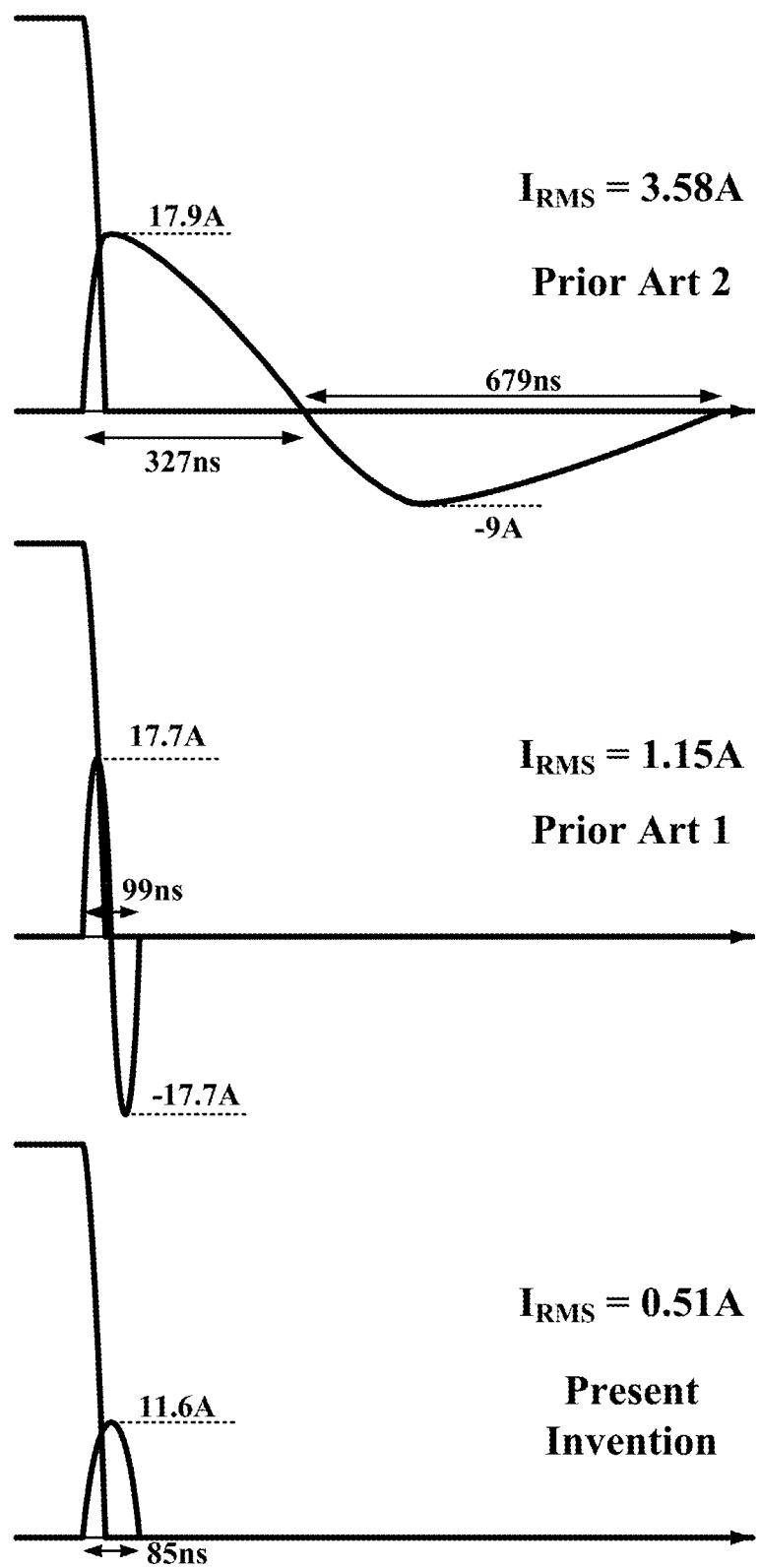
FIG. 7 plots voltage across the main switch and the current injection from the topology of FIGS. 1, 2 and 5.

FIG. 7 presents the current injection for a studied case wherein the parasitic capacitance of an IRF820 is discharged from an input voltage of 400V with a repetition frequency of 60 Khz; the three plots show data gathered from converters incorporating current injection methods of prior art 1, prior art 2 and RCIT as presented herein. The duration of the current injection, its amplitude, and the RMS of the current injection for each case are shown. It can be seen that the RMS current through the current injection in "prior art 2" is larger than "prior art 1" and the duration of the current injection is longer.

While "prior art 2" solves drawbacks associated with "prior art 1" the penalty is an increase in the RMS current and a longer duration of the current injection. For example, in said implementation the duration of the current injection in "prior art 2" is 327 uS+679 uS=1 mS, and the RMS current for a 60 Khz switching frequency is 3.58 A as presented in FIG. 7. The duration of the current injection in "prior art 1" is 99 nS and the RMS current for a 60 Khz switching frequency is 1.15 A; for the method using RCIT as presented in this disclosure, the duration of the current injection is 85 nS and the RMS current for a 60 Khz switching frequency is 0.51 A.

Again, the RCIT concept is presented in FIG. 1. The current injection sub-circuit A 126 of the current injection circuit 13 includes a controlled voltage source, Vinj, 134, and a diode Dinj, 132; an optional current injection capacitor Cinj, 136 which is placed in between Vinj$^+$, 128, and Vinj$^-$, 130, terminals. The discussion now turns back to that RCIT, the current injection circuit 13, and the current injection sub-circuit A 126 within the current injection circuit 13.

Figure 8:
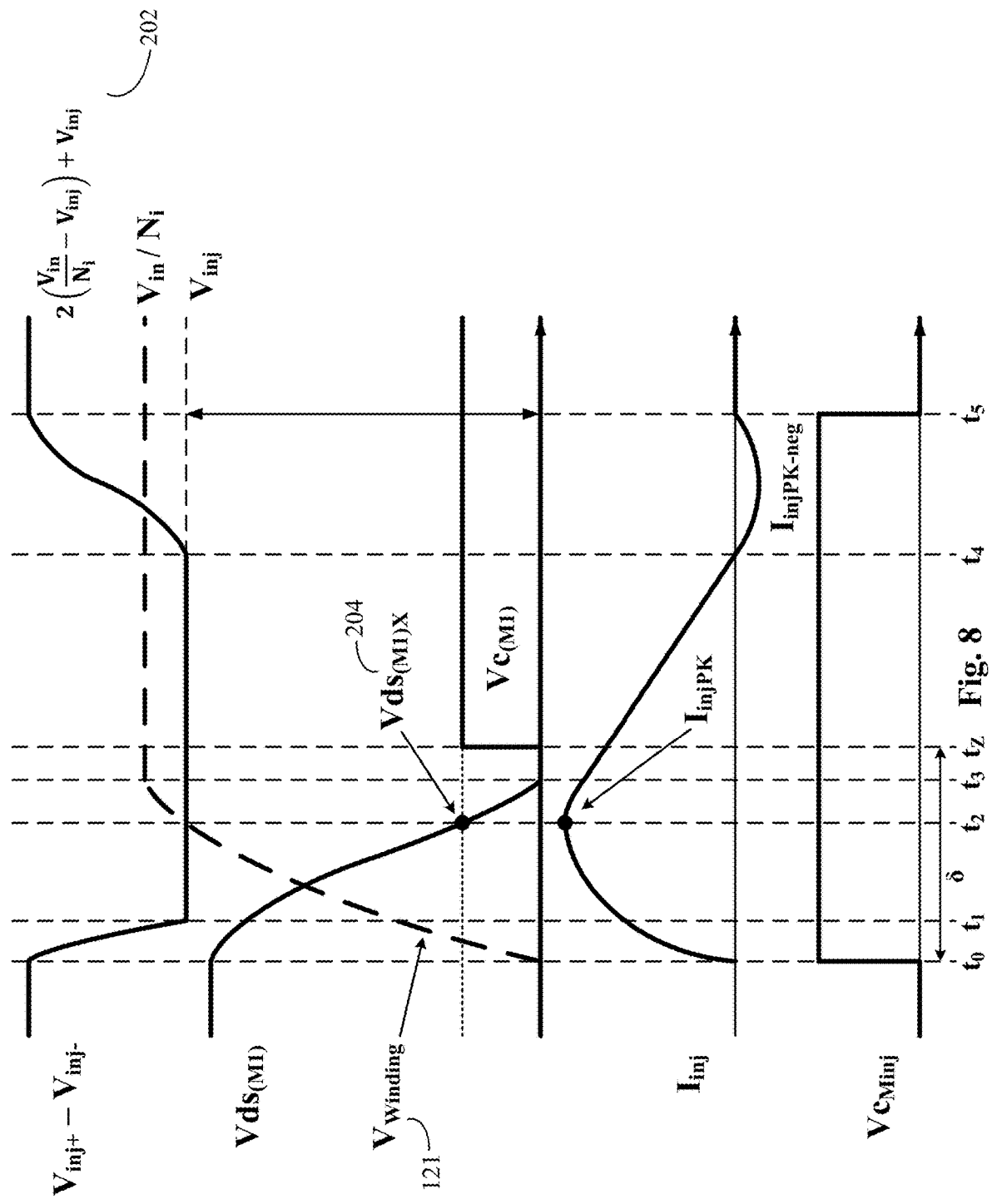
FIG. 8 plots waveforms of the power train of FIG. 1.

Waveforms of this technology are presented in FIG. 8, and they are: the voltage between Vinj$^+$, 128, and Vinj$^-$, 130, terminals; the voltage across M1, 106, $Vds_{M1}$; the voltage across the current injection winding, Vwinding; 121; the current injection, Iinj, 122; the control signal for Minj, 140, VcMinj.

At t0 the current injection switch Minj, 140, is turned on. The voltage Vinj$^+$–Vinj$^-$ has an amplitude expressed by formula 202. The current through the leakage inductance between the primary winding, 102, and the current injection winding, 120, starts to build up until t1. In the event there is a current injection capacitor Cinj, 136, placed in between Vin+, 128, and Vinj−, 130, there is a resonant decay of the voltage across Cinj, 136, and a resonant buildup of the Iinj, 122, current until t1.

At t1 the voltage between Vinj+, 128, and Vinj−, 130, reaches the level of Vinj, 134. Further the current Iinj starts to build up with a slope dictated by the leakage inductance between winding 102 and winding 120 and by the voltage difference between Vinj, 134, and the voltage across current injection winding, 120, Vwinding, 121. The voltage reflected to current injection winding from the primary winding 102, is (Vin−Vds$_{M1}$)/Ni. The current injection reflected in the primary, Iinj/Ni discharges the parasitic capacitance Ceq1, 110, reflected across the primary switch M1, 106.

At t2, the voltage reflected across the current injection winding, 120, which is given by the formula (Vin−Vds$_{M1}$)/Ni reaches the level of Vinj, 134. At that time the Iinj current reaches its peak at t2. The amplitude of the voltage across M1, 106, Vds$_{M1}$ when the current injection reaches its peak is Vds$_{(M1)x}$.

After t2, the current injection amplitude starts to decrease and further discharge the parasitic capacitance Ceq1, 110, until the voltage across M1, 106, reaches zero voltage at t3.

After t3, the current injection, Iinj, continues to decay linearly, as described by the following equation $$d\frac{(I_{inj})}{dt} = \frac{\left(\frac{V_{in}}{N_i} - V_{inj}\right)}{L_{lk(inj)}}$$

wherein Llk(inj), 230, is the leakage inductance between the primary winding 102 and the current injection winding 120, and reported to the current injection winding.

At t4, the Iinj amplitude reaches zero and after that, function of the presence of the current injection capacitor Cinj, 136, and its value the recharge of Cinj, 136, cycle starts and after Cinj, 136, is recharged, the Iinj current reaches zero level again at t5. From t4 to t5 the Cinj, 136, changes amplitude from Vinj to the amplitude, as described by formula 202 from FIG. 8.

Current injection under RCIT functions without the presence of Cinj, 136. The presence of Cinj, 136, creates a hybrid structure wherein the energy contained in current injection is a summation of the resonant energy from Cinj, 136, plus the energy delivered from Vinj, 134, source. In practical applications, this provides the engineer with the flexibility to tailor the weight of these two sources of energy and also tailor the shape of the current injection.

As depicted in FIG. 8, the current injection reaches its peak when the voltage across the injection winding, 120, labeled Vwinding, 121, becomes equal to Vinj. The voltage across M1 when the Iinj reaches its peak, is labeled Vds (M1)x and its amplitude is described by the following formula 212.

$$V_{ds(M1)x} = V_{in} - N_i * V_{inj} \quad (212)$$

In RCIT current injection, the designer can control the level of voltage across the main switch wherein the current injection Iinj reaches its peak. Through the control of Vinj, the designer can ensure that the primary switch can turn on at zero voltage switching in all the operating conditions regardless of the value of Ceq1. By increasing V$_{inj}$ level in such a way that Ni*V$_{inj}$ is closer to Vds$_{(M1)x}$, the peak for the Iinj is reached at a lower level of voltage across the primary switch, which ensures zero voltage switching for the primary switch M1, 106.

Figure 9:
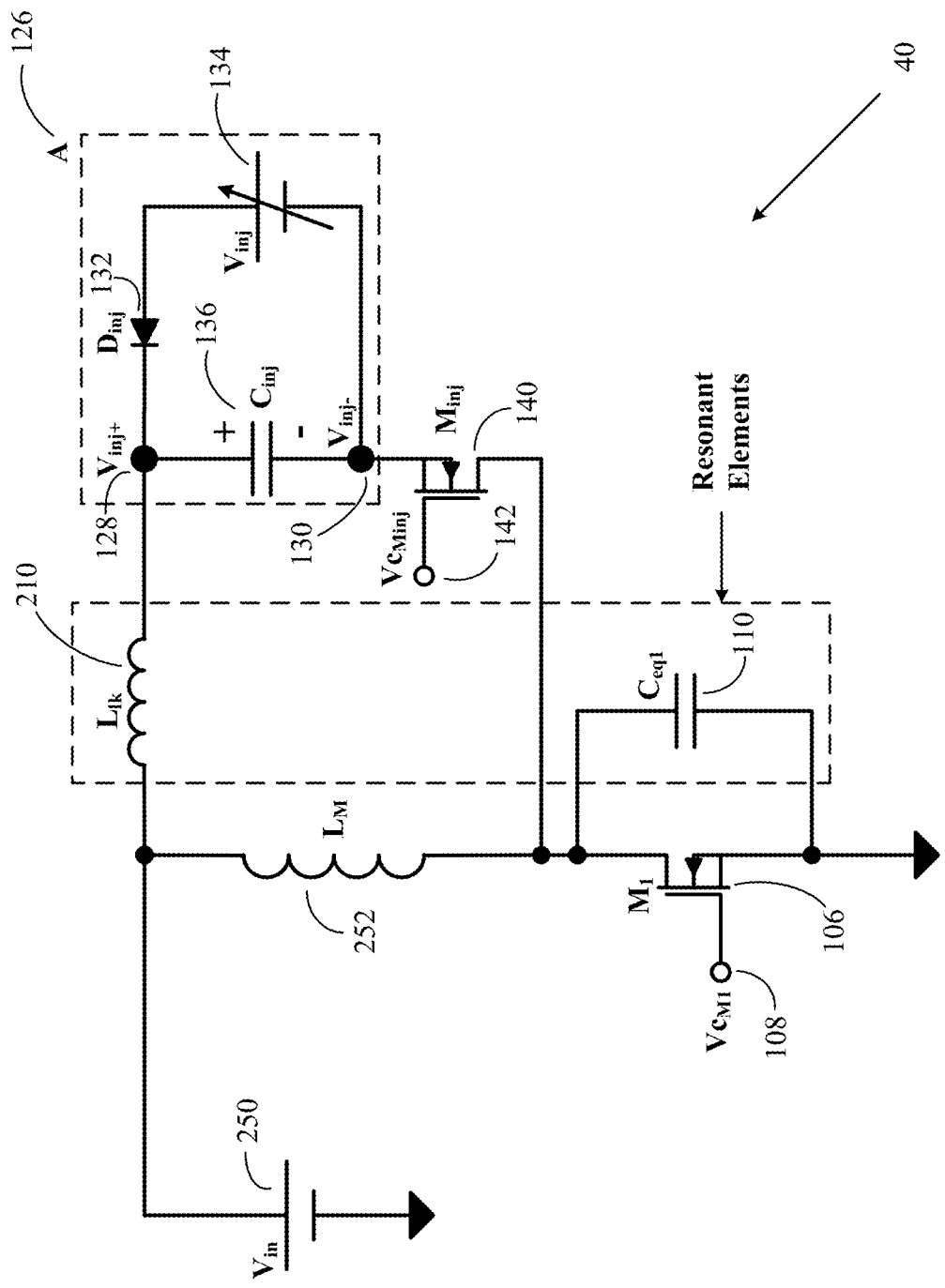
FIG. 9 is a schematic representation of a simplified circuit of the topology of FIG. 1.

FIG. 9 presents an equivalent circuit 40 of the main power train presented in FIG. 1, but the transformer Tr1, 100, is replaced by the simplified model of a transformer composed by the magnetizing inductance LM, 252, and the leakage inductance Llk, 210, which is the leakage inductance reported to the primary winding, 102. L$_{lk}$=L$_{lk(inj)}$*N$_i^2$. The sub-circuit A, 126, is also reflected into the primary winding, by the turn ratio Ni. The same applies to Minj, 140. When a circuit is reflected by a turn ratio Ni, the capacitive elements are divided by N$_i^2$, the inductive elements are multiplied by N$_i^2$, and the resistive elements are multiplied by N$_i^2$. For simplicity, the drawing from FIG. 9 uses the same references characters as those used in FIG. 1, because the purpose of this equivalent schematic is to show the mode of operation not to offer a quantitative measurement. It is understood that one having ordinary skill in the art will understand that elements with the same reference characters are the same, and so description of such elements may not be included below, because one having ordinary skill in the art will readily understand their structure and operation from the above description.

Figures 10A, 10B:
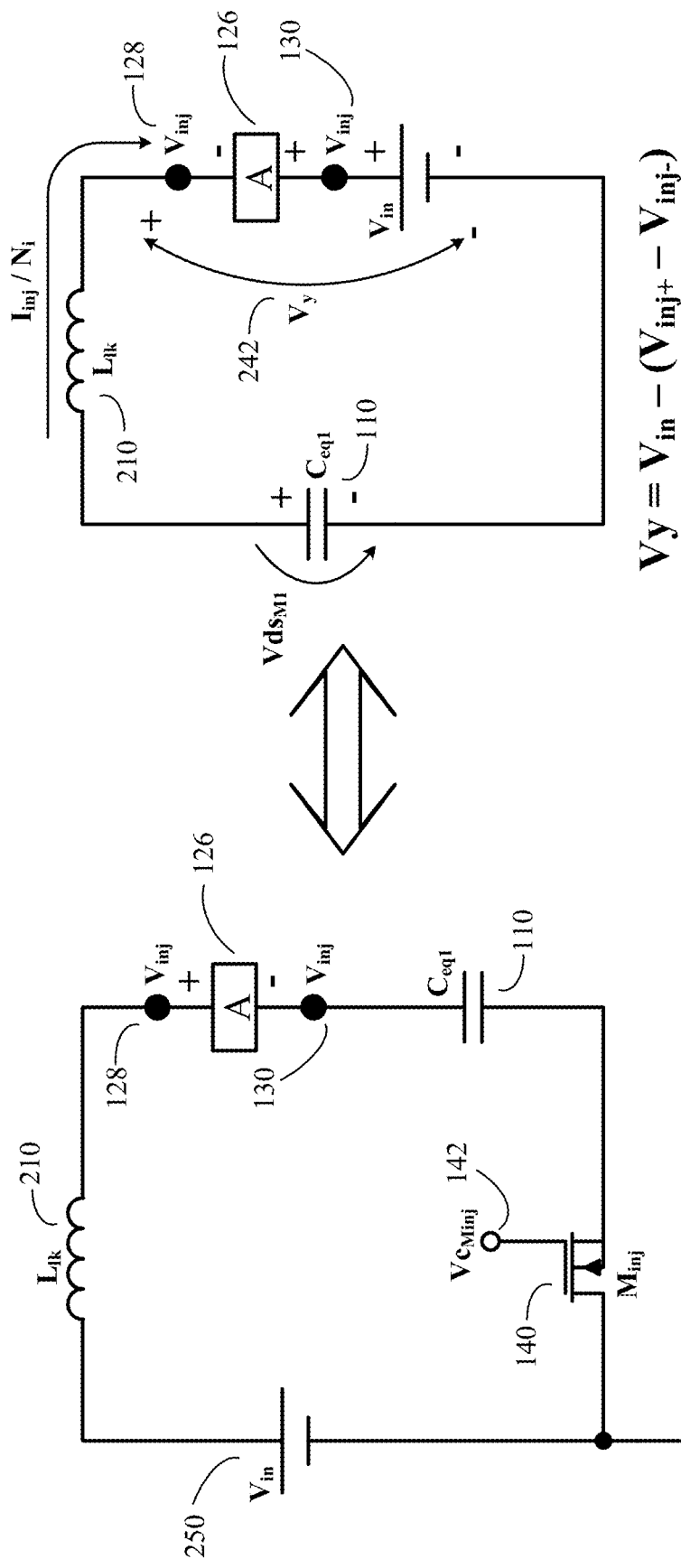
FIG. 10A is a schematic representation of the circuit of FIG. 9 further simplified.
FIG. 10B is a schematic representation of the circuit of FIG. 10A further simplified.

In FIG. 10A, the equivalent circuit of the schematic from FIG. 1 is further simplified, and the L$_M$, 252, is eliminated because its impedance is much larger than the components connected in parallel with it. When Minj, 140, is turned on the equivalent circuit from FIG. 10A becomes the equivalent circuit from FIG. 10B. In FIG. 10B, it is seen that the parasitic capacitance Ceq1, 110, is discharged via the leakage inductance, Llk, 210, by a voltage source, Vy, 242, equal to V$_{in}$−(V$_{inj+}$−V$_{inj-}$)*N$_i$. From this equivalent circuit, it is visible that when the voltage across Ceq1, 110, is equal to Vy, 242 the current slope through Llk, 210, is zero and it means that the Iinj is reaching its peak. In FIG. 10B, the resonant circuit is reduced to Ceq1, 110, and Llk, 210.

Figure 11:
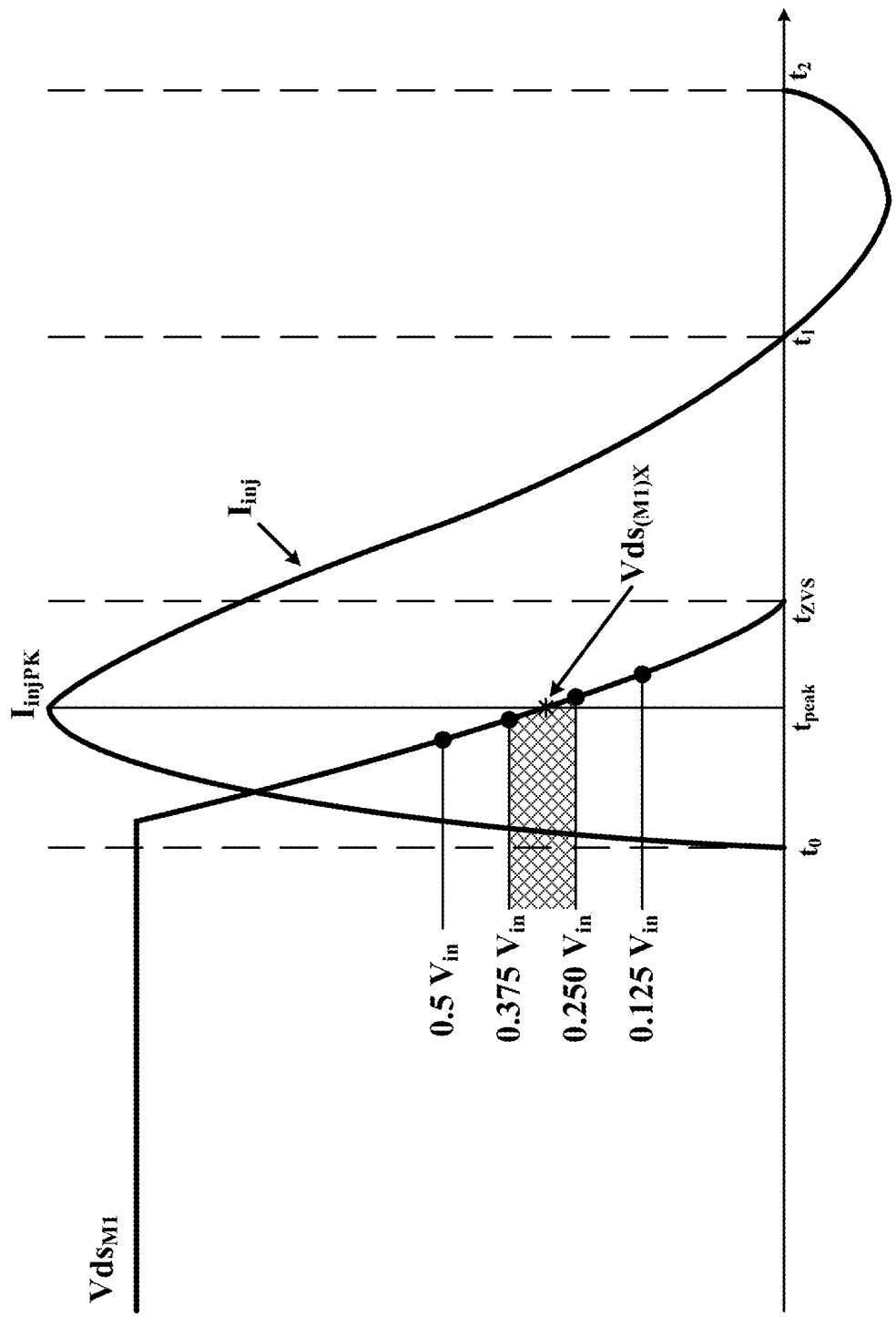
FIG. 11 plots voltage across the main switch and the current injection from FIG. 1.

FIG. 11 presents the voltage across the main switch M1, 106, and the current injection. In this drawing, based on detailed calculations for a given implementation, it was established that for optimum (though not critical) operation in regard to efficiency, the peak current injection shall coincide with a voltage across the primary switch between 0.375*Vin and 0.250*Vin. Controlling the voltage level across the primary switch when the current injection reaches its peak is a great feature of RCIT. The "prior art 1" cannot control the amplitude or the time wherein the current injection reaches its peak in regard of the voltage across the primary switch. The energy of the current injection is defined in "prior art 1" by Vin, 104, and the value of Cr, 150. In "prior art 2", the current injection reaches its peak at the moment when the voltage across M1, 106 reaches zero and that level cannot be changed. The capability to control the voltage level across the main switch wherein the current injection reaches its peak allows the engineer using this technology to optimize the current injection circuit M, 124 and minimize the RMS current while obtaining zero voltage switching conditions across the primary switch M1, 106 in any operating conditions.

Figure 12:
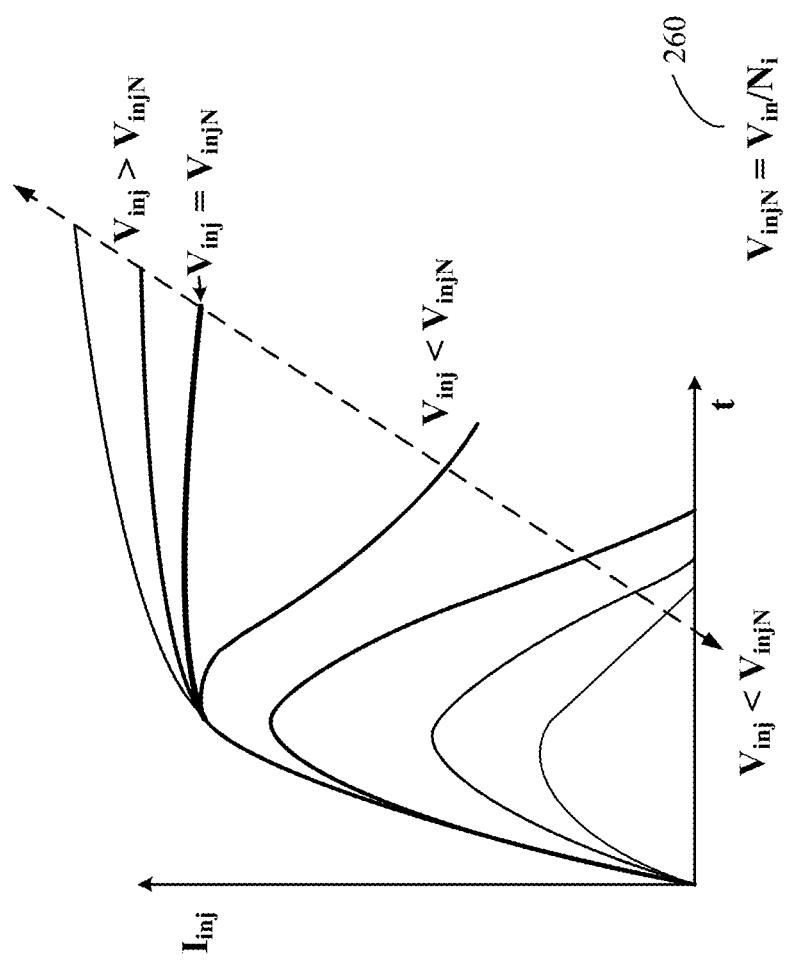
FIG. 12 plots the shape of the current injection of FIG. 1 against the value of a controlled voltage source.

FIG. 12 presents the shape of the current injection versus the value of Vinj. A parameter, VinjN was introduced which is defined as Vin/Ni, presented in equation 260 from FIG. 12. This parameter is dependent of the input voltage level. For Vinj equal to VinjN, the current injection has a trapezoidal shape which is not desirable because Minj, 140, will be turned off with positive current through it which will lead to high voltage spikes between drain to source. Ideally, the current injection shall be zero or negative when Minj, 140 is turned off, which means that Vinj shall be smaller than VinjN over the entire input voltage range. The presence of Cinj, 136, assists in this regard because the resonance associated with Cinj, 136, and the leakage inductance between primary winding 102 and current injection winding 120 creates the negative current component, helping in shaping the current injection to be zero or negative before the Minj, 140, is turned off.

Figure 13:
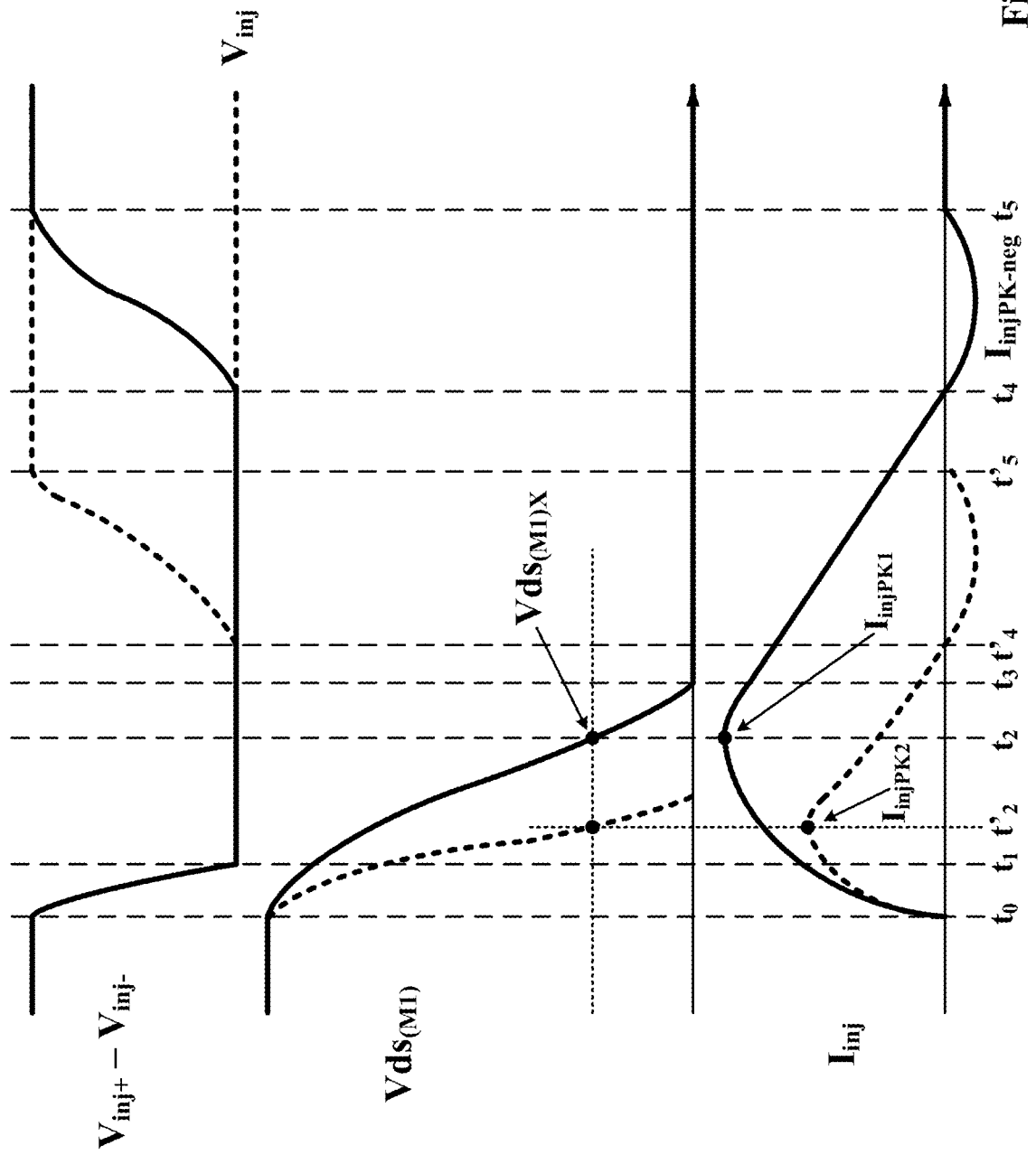
FIG. 13 plots waveforms of a circuit of FIG. 1 against the variation of a parasitic capacitance, thereby showing a self-adjusting feature of RCIT.

FIG. 13 presents waveforms of an RCIT circuit as exemplified in FIGS. 1, 18, 19, and 20, for example. The waveforms depicted are $(V_{inj+} - V_{inj-})$; the voltage across primary switch M1, 106, VdsM1 and the Iinj, 122. These waveforms are presented in two conditions. The continuous line represents waveforms for a parasitic capacitance across the primary switch M1, 106, of Ceq1A. The dotted lines represents waveforms for a parasitic capacitance across the primary switch M1, 106, of a value Ceq1B, wherein Ceq1A>Ceq1B. FIG. 13 explains the self-adjusting characteristic of RCIT for the tolerance of Ceq1, 110. In the case wherein the value of the parasitic capacitance Ceq1, 110, is Ceq1A, the current injection builds up from t0 to t1 with the energy from Cinj, 136, and the voltage $(V_{inj+} - V_{inj-})$ decays from $$\left(2 * \left(\frac{V_{in}}{N_i} - V_{inj}\right) + V_{inj}\right)$$

to the level of Vinj, 134. After t1 the current injection continues to build from t1 to t2; at t2, the current injection reaches its peak, IinjPK1, when the voltage across M1, 106, reaches $Vds_{(M1)X}$. The value of Vds(M1)X is presented in the equation 212

Further the current injection amplitude decreases toward zero level. At t4, it reverses its polarity in order to recharge Cinj, 136, and at t5, it reaches zero again after Cinj, 136, is recharged. In the event Cinj, 136, is not present, the negative current injection between t4 to t5 is not present and the current injection reaches zero at t4 and stays at the zero level until the next cycle.

When Ceq1, 110, has a smaller value such as Ceq1B from t1 to t2' the current ramps up until the voltage across M1, 106, decays to Vds(M1)X, when Iinj reaches its peak IinjPK2 at t2'. Iinjpk2 is smaller than IinjPK1 and the time interval between (t0 to t5) is larger than the time interval between (t0 to t5') as a result the RMS of the current injection is smaller for a lower value of Ceq1, 110. RCIT allows the current injection to self-adjust its amplitude to ensure that the voltage across the primary switch reaches zero level before the primary switch M1, 106, turns on, and, in addition, it self-adjusts its peak and RMS current function of the value of the parasitic capacitance reflected across the primary switch M1, 106. The latest feature leads to a higher efficiency of operation of the converter wherein this technology is applied.

Figure 14:
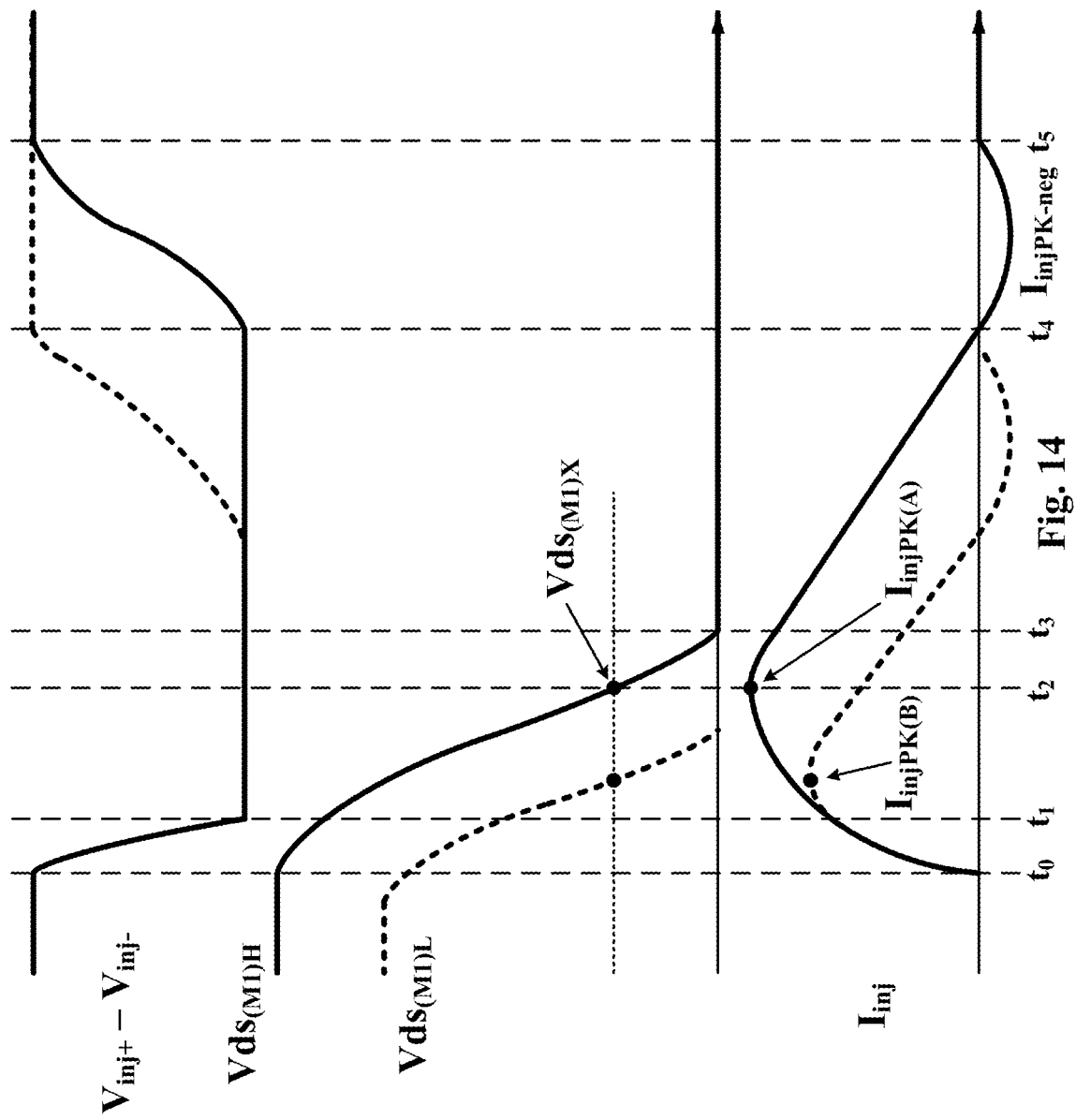
FIG. 14 plots waveforms of the circuit of FIG. 1 against the variation of the voltage level at which a current injection switch is turned on, thereby further showing the self-adjusting feature of RCIT.

FIG. 14 presents another self-adjusting feature of RCIT. In some applications, the voltage across the main switch does have an amplitude fluctuation such is the ringing across the primary switch during the dead time as depicted in FIG. 4. Like in FIG. 13, FIG. 14 depicts waveforms of the RCIT, including: $(V_{inj+} - V_{inj-})$; $Vds_{M1}$ in two cases: $Vds_{(M1)H}$ and $Vds_{(M1)L}$; and Iinj. FIG. 14 presents two cases for the voltage across the primary switch M1. The first is $Vds_{(M1)H}$ wherein the main switch will turn on at a high voltage level during the ringing and the voltage across M1, 106, and the current injection that is depicted with a continuous line. The second is $Vds_{(M1)L}$, wherein $Vds_{(M1)H} > Vds_{(M1)L}$ wherein the voltage across the primary switch and the current injection are depicted with a dotted line.

There are applications in which the optimum voltage across the primary switch to turn the primary switch on is not always zero. RCIT has the capability to control the turn on of the primary switch at any voltage level across the primary switch as desired. For example, in flyback converter application for 65 W adapters, the turn on voltage for the primary switch is optimized to be around 50V and not zero volts. In the event that the energy for Vinj comes from harvesting the energy from parasitic elements such as the leakage inductance of the transformer, RCIT offers an avenue to transfer energy from Vinj to the input voltage source, besides discharging the parasitic capacitance across the primary switch. In applications such as flyback operating in discontinuous mode wherein the voltage across the primary switch experience a ringing (as depicted in FIG. 4), the turn on of the current injection switch can be accomplished at the valley to decrease the energy consumption in discharging said parasitic capacitor Ceq1, 110. However, at very low input voltages, the valley may be under the $Vds_{(M1)X}$ level. In such cases, the Cinj capacitor helps to ensure proper operation of the current injection. Another solution is to force the turn on of the current injection switch not on the valley but to a higher voltage level larger than $Vds_{(M1)X}$.

In the RCIT, the current injection builds up until the voltage across the main switch M1, 106, decays to the level of $Vds_{(M1)X}$, presented in equation 212. If the voltage across the main switch, when the current injection switch turn on is low, there will be less time for the $Vds_{M1}$ to reach $Vds_{(M1)X}$. As a result, the amplitude of the current injection is lower and also the RMS of the current injection is lower. When the voltage across the main switch at which the current injection turn on is higher, such as $Vds_{(M1)H}$, then it will take a longer time for the $Vds_{M1}$ to reach $Vds_{(M1)X}$ level and as a result the Iinj current will build up to a higher amplitude. This self-adjusting feature of RCIT allows an efficiency optimized operation in any condition.

Figure 16A:
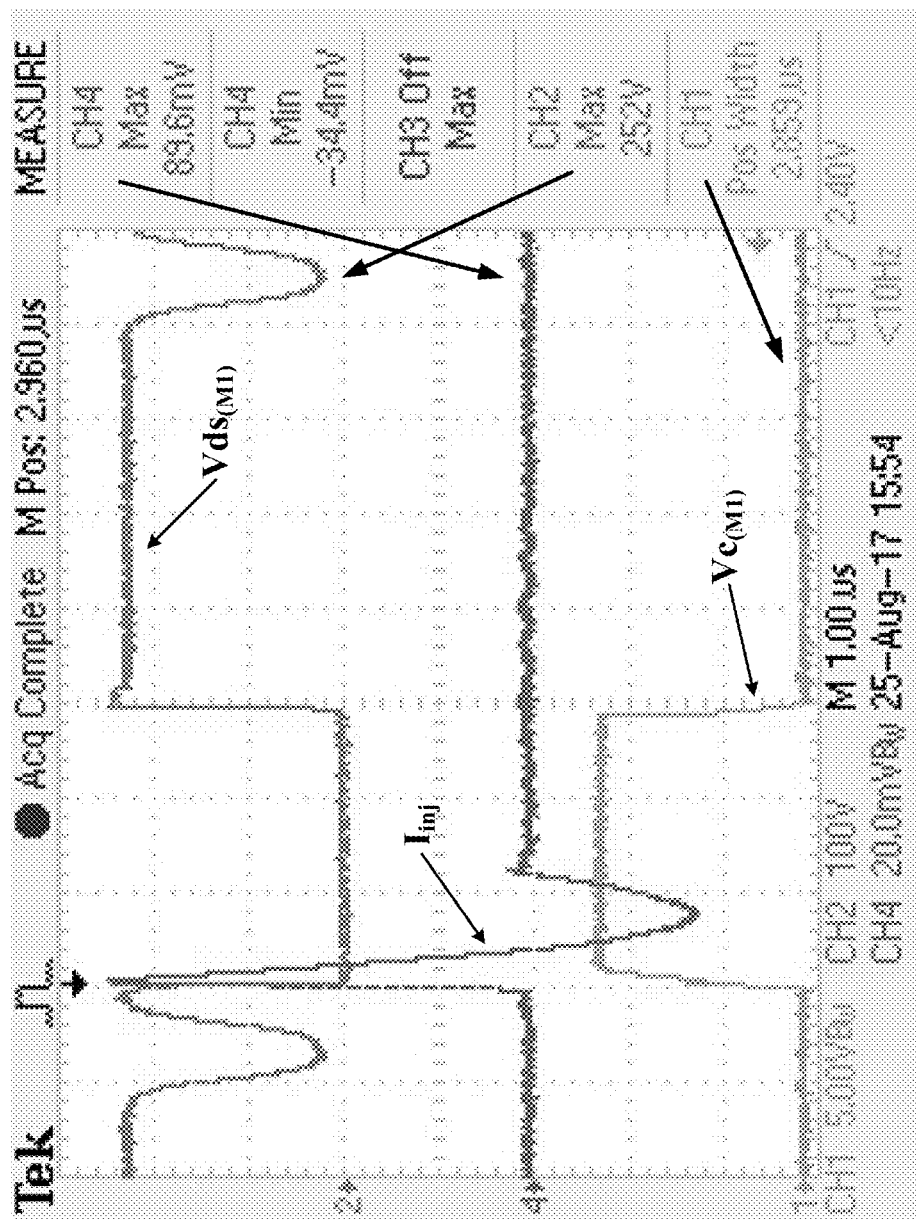
FIG. 16A plots waveforms in a flyback converter operating in discontinuous mode using RCIT when the current injection switch is turned on at the peak of the ringing during the dead time.
Figure 16B:
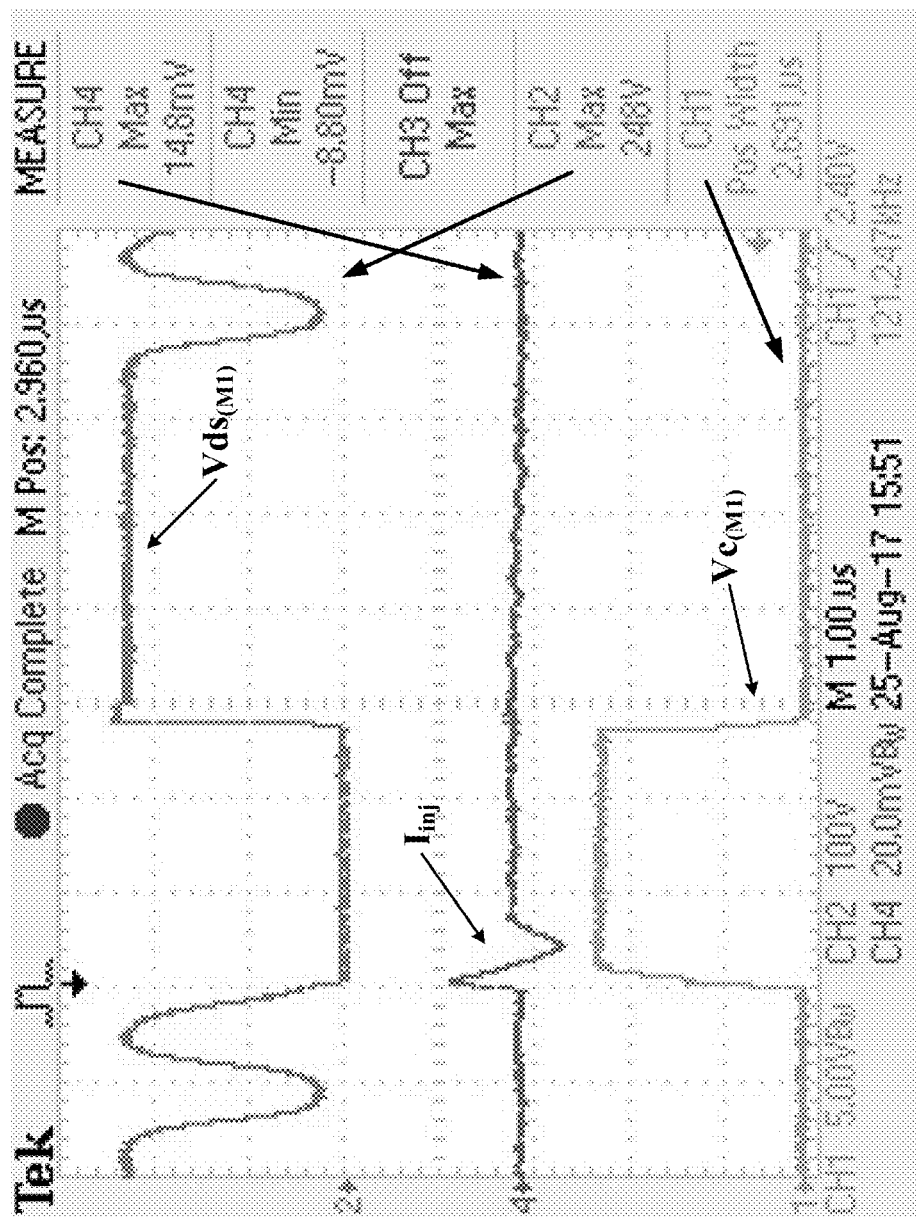
FIG. 16B plots waveforms in the flyback converter of FIG. 16A operating in discontinuous mode using RCIT when the current injection switch is turned on at the valley of the ringing during the dead time.

The self-adjusting feature of RCIT is exemplified in some experimental waveforms from a flyback converter operating in discontinuous mode. FIG. 16A presents the voltage across the main switch M1, 106, in a flyback topology as the flyback topology depicted in FIG. 1. The current injection switch was turned on at the "hill" of the ringing across the primary switch and the amplitude of the current injection is approximately 4.5 A. When the current injection switch is turned on at the valley as is presented in FIG. 16B, the current injection amplitude is reduced to less than 1 A. This is an exemplification of the self-adjusting feature of RCIT previously described.

Figure 15:
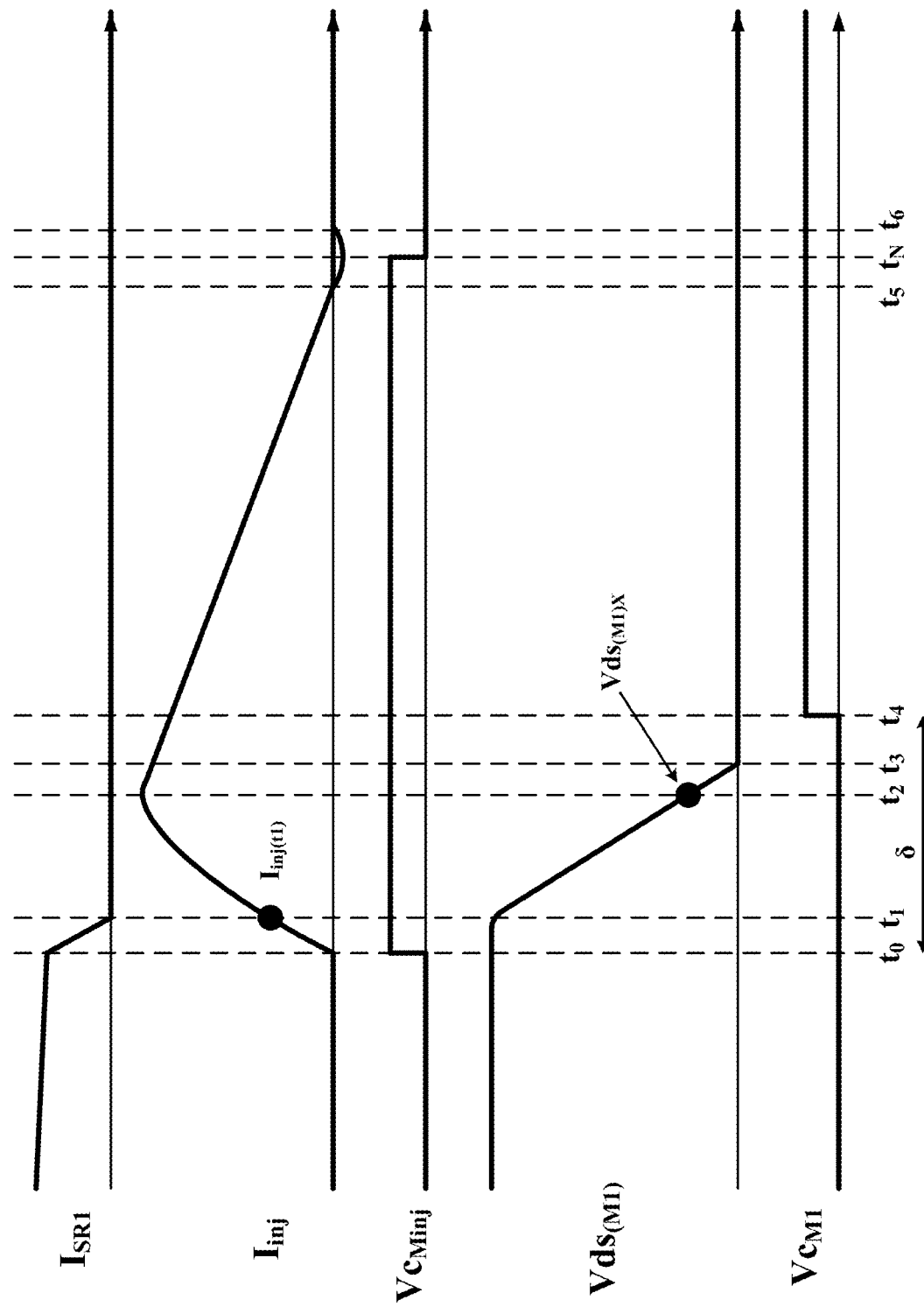

The analysis for the RCIT circuit depicted in FIG. 1 was made only for the operation wherein SR1, 114, was not conducted. FIG. 15 presents the operation of the RCIT circuit when there is current flowing in the secondary winding, 112, of transformer TR1, 100, when the current injection Minj, 140 is turned on.

In FIG. 15, there are waveforms of FIG. 1 when there is current flowing through SR1, 114 at t1, the time wherein the current injection switch, Minj, 140 is turned on. The waveforms depicted in FIG. 15 are: the current through SR1, 114, ISR1; the current injection Iinj; the control signal for Minj, 140, VcMinj, the voltage across M1, 106, $Vds_{M1}$; the control signal for M1, 106, Vc(M1).

At t0, the current injection switch Minj, 140, is turned on. The current Iinj, 122, starts flowing through the current injection winding. The current injection will flow through the transformer Tr1, 100, windings following the minimum impedance path. Because SR1, 114, is conducting, it offers a low impedance path for current injection through the winding 112. The current injection reflected to the winding 112 will flow toward the dot of the winding in opposite polarity to the current flowing through SR1, 114. At t1, the current injection amplitude reflected in the winding 112 will exceed the current through SR1, 114, and the current through SR1, 114, will become zero, and SR1, 114, will turn off. When SR1, 114, turns off and there is no more current flowing through winding 112, the current injection will start flowing through the primary winding Np, 102, toward the dot and start discharging the parasitic capacitance Ceq1, 110, toward zero.

From t0 to t1, the voltage across M1, 106, $Vds_{M1}$ does not change, as presented in FIG. 15. At t1, the current injection reflected into the winding 112 reaches the level of the current flowing through SR1, 114, but of opposite polarity.

$$I_{inj(t1)} = -I_{(SR1)} * \frac{N_s}{N_{inj}}.$$

At t1, the current through SR1, 114, reaches zero and SR1 is turned off.

After t1, because the impedance via secondary winding 112 increases due to the turn off of SR1, 114, the current injection continues to flow through the primary winding discharging the parasitic capacitance reflected across M1, 106. The amplitude of the current injection continue to increase until the voltage across M1, 106, will reach Vds (M1)X at t2.

After t2, the current injection starts to decay until it reaches zero at t5. From t5 to t6, the current becomes negative while the value of Cinj, 136 is recharged during the time interval from t5 to t6. The Minj, 140, turns off at $t_N$ which is between t5 and t6 while the current injection is negative. This prevents any spikes across Minj, 140 at turn off.

The RCIT current injection self-adjusts even in a condition in which there is current flow through the rectifier means in the secondary, and the current injection increases until the amplitude of the current injection reflected into the secondary winding which is conducting reaches the amplitude of the current flowing through said secondary winding, but of opposite polarity. After the rectifier means in the secondary turns off at zero current, the current injection further increases until the voltage across M1, 106, reaches the $Vds_{(M1)X}$ level. In the event that the delay time δ between the turn on of the current injection switch Minj, 140, and the turn on of the main switch M1 is not sufficient to allow the current injection to fully discharge the Ceq1, 110, to zero, the δ can be increased accordingly.

In applications in which the rectifier means are conducting, then, regardless of the amplitude of the current flow through the secondary winding connected to the rectifier means, the current injection increases automatically, without external control, until it exceeds the level of the current through said rectifier means. The controller of the converter then has to only adjust the delay time δ to ensure that there is enough time to discharge the Ceq1 to zero, or any other desired preset level, before the primary switch M1, 106, turns on.

Figure 17:
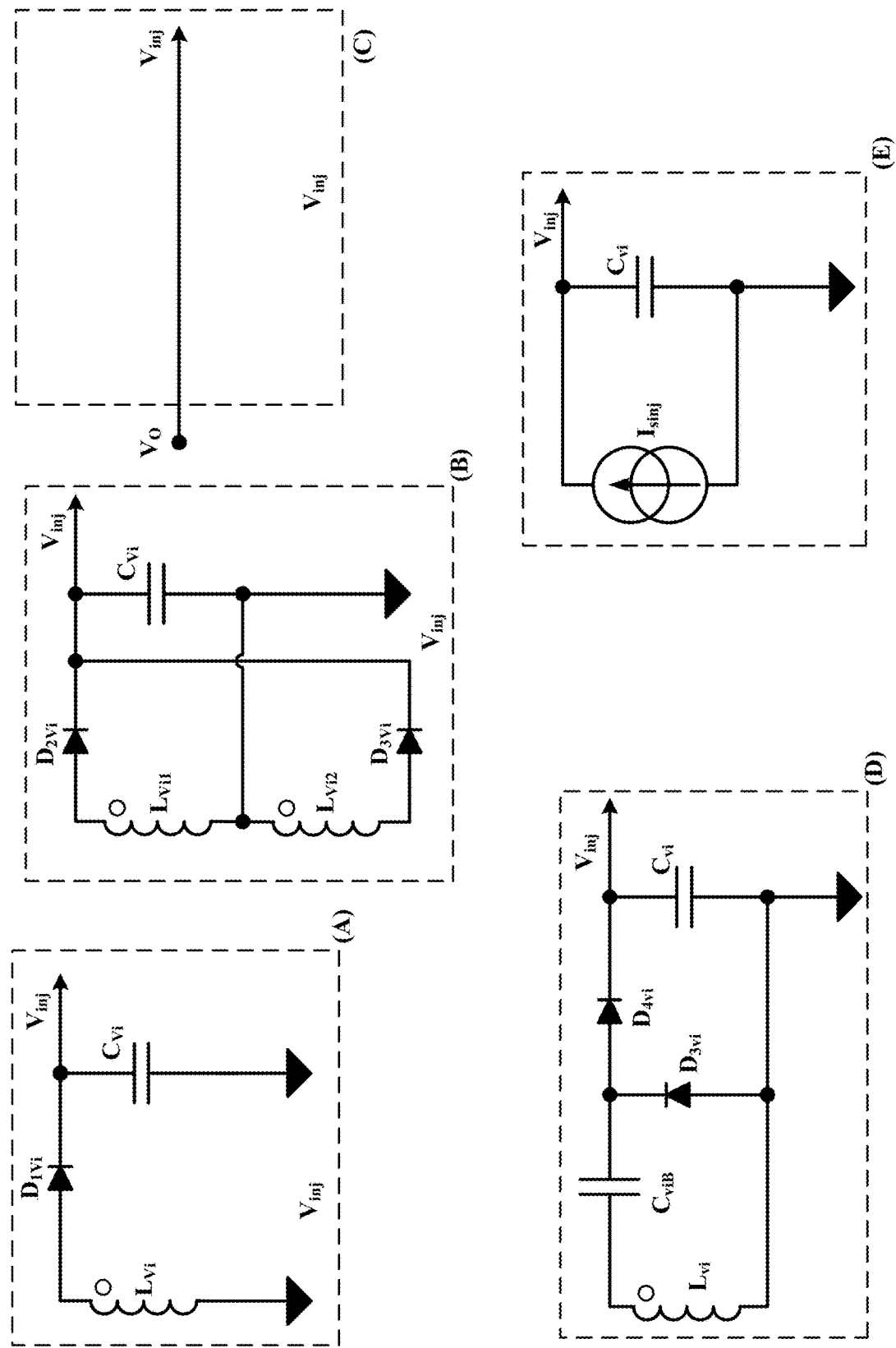
FIG. 17 illustrates schematic representations of several circuit configurations wherein the controlled voltage source can be obtained.

FIG. 17 presents several circuits A-E which can produce the Vinj for use in the current injection circuit M, 124. In the circuits A, B, and D, the Vinj is proportional to Vin. In the circuit C, the Vinj is fixed. In the circuit E, the Vinj is proportional to the current source Isinj. The windings Lvi, Lvi1 and Lvi2 are placed on the same transformer as the current injection windings. The Vinj can be also produced by an auxiliary converter, wherein Vinj is tailored by an intelligent processor in order to tailor the current injection for a given purpose. RCIT is applicable in any power level and can be instrumental for very high power levels wherein all the switching elements can be turn on at zero voltage and that can be accomplished with minimum hardware changes, just by adding current injection circuits M, 124 and current injection winding in the transformer.

Figure 18:
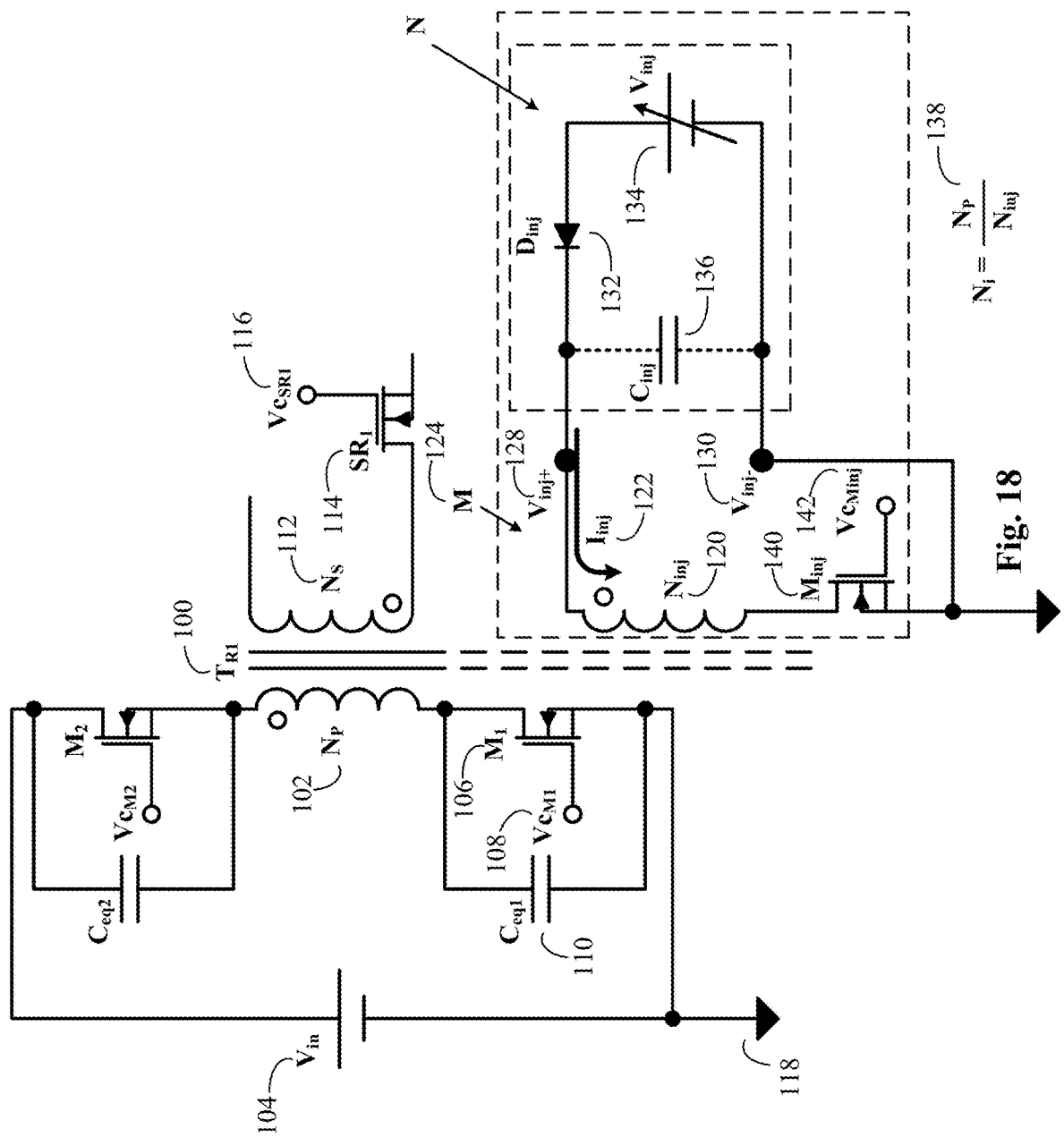
FIG. 18 is a schematic representation of a two-transistor forward topology using RCIT.

FIG. 18 presents incorporation of the RCIT current injection in a two-transistor forward converter topology. In U.S. Pat. Nos. 9,899,929 and 10,050,545, methods for obtaining soft switching across the primary switches in a two-transistor forward topology are presented. In those two patents, the current injection solution to obtain zero voltage switching uses the "prior art 2" methodology for current injection. In FIG. 18, however, the two-transistor forward topology incorporating RCIT for the current injection is presented. This allows the two-transistor forward converter with zero voltage switching to benefit from all the advantages of RCIT, such as the self-adjusting characteristics, the control capability characteristics, and the potential to be optimized for maximum efficiency.

Figure 19:
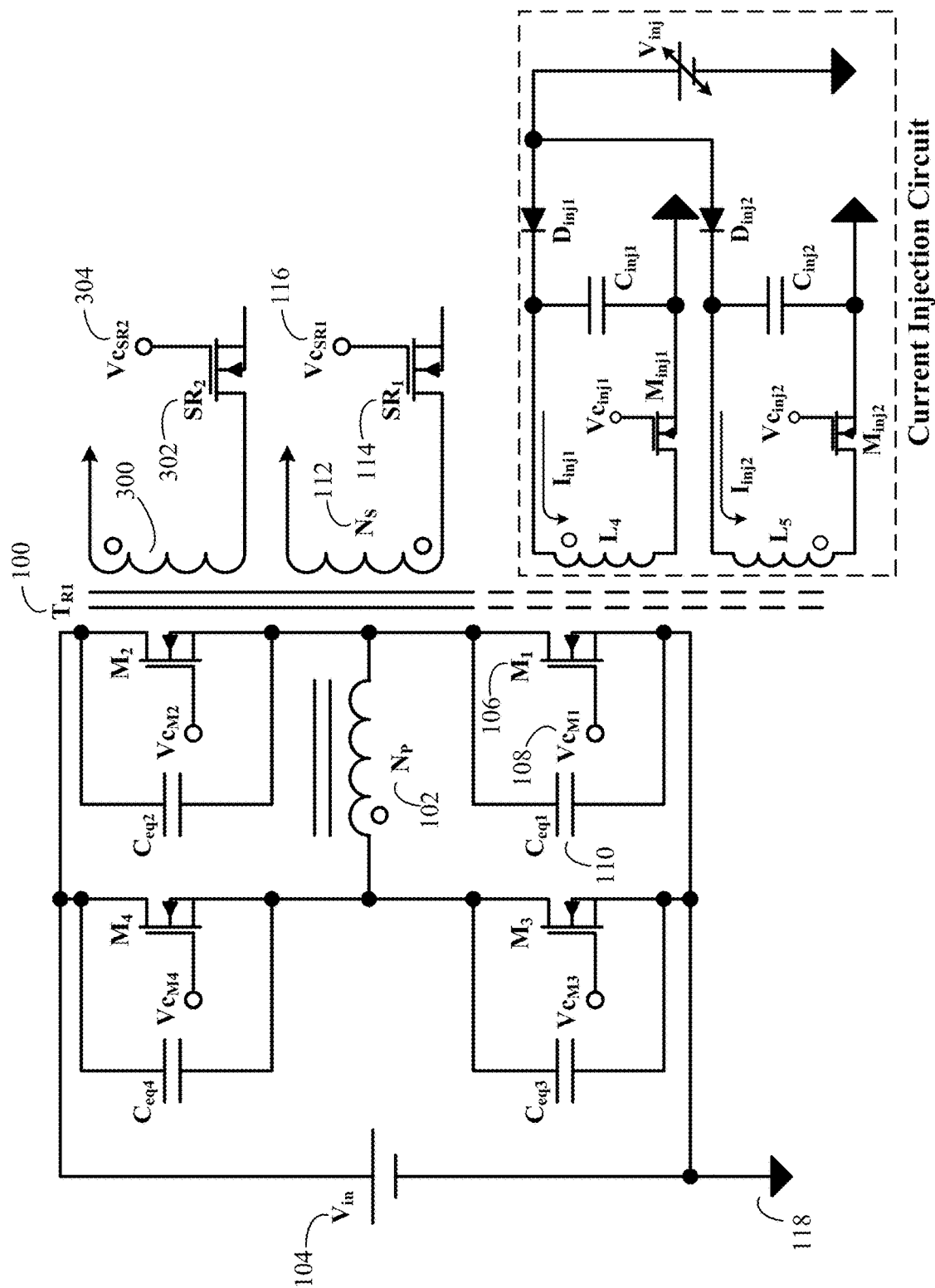
FIG. 19 is a schematic representation of a full-bridge topology using RCIT.

FIG. 19 presents a full-bridge topology utilizing the RCIT. The full-bridge can be conventional full-bridge topology or phase-shifted full-bridge topology. The disclosure of U.S. Pat. No. 10,291,140 presents a full-bridge phase shifted topology with a current injection employing the "prior art 2" technology. In double-ended full-bridge topology there are two current injections circuits, each one designed to deplete the current flowing through each synchronized rectifier as presented in FIG. 19. Each current injection circuit has a corresponding rectifier means, so that there are two rectifier means in the secondary. For example, in FIG. 19, the current injection circuit using Minj1 has a corresponding first rectifier means, SR1, 114 and the current injection circuit using Minj2 has a corresponding second rectifier means, SR2, 302. After the synchronized rectifiers are turned off at zero current, the current injection continues to flow through the primary winding Np, 102 to discharge the parasitic capacitances across the primary switching elements, to zero. Incorporating RCIT current injection, with the features presented in this disclosure, will help in increasing the efficiency and the simplicity of control due to the natural self-adjusting features of RCIT.

In RCIT, the voltage level across M1, 106 at which M1 turns on is fully controlled by two parameters, the Vinj and also by delay time δ, which is the delay time between the turn on of the current injection switch and turn on of the primary switch as depicted in FIG. 8 and FIG. 15. In most of the applications the goal is to turn on the primary switch at zero voltage. By tuning Vinj and the delay time δ, the desired voltage across main switch at which the main switch turns on can be fully controlled regardless of the operation conditions.

There are applications wherein the amplitude of the current flowing through the secondary winding via rectifier means is very high; in such applications, it is preferable that several current injection circuits work in parallel. The total current injection design to force the current through the rectifier means is the summation of the current injection produced by said current injection circuits. The multiple current injection circuit can also work in a phase shift mode and, in this case, the total current injection can be shaped in any form which is optimal for the application.

The mode of operation of RCIT in other topologies is the same as the one presented for the flyback topology. In most of such applications there is current flowing in the secondary windings when the current injection switch is turned on. As previously described in this description, the current injection builds up through the leakage inductance between the current injection winding and the secondary windings wherein the current is flowing. The polarity of the current injection windings are chosen in such a way that when the currents build up through each current injection winding, the currents get reflected into the corresponding secondary windings which conducts current, with opposite polarity to the current from said secondary windings. The current injection continues to build up until the current injection reflected in said secondary winding reaches the same amplitude, but the opposite polarity, of said current flowing in said secondary winding and at that point the current through the rectifier means in the secondary winding becomes zero and the rectifier means will be turned off. This also applies if there are several secondary windings wherein the current is flowing. After all the rectifier means connected to the secondary windings are turned off, the current injection will reflect in the primary windings and will start discharging the parasitic capacitance reflected across the primary switching elements toward zero.

Each current injection winding does have a corresponding secondary winding connected to a rectifier means. When the current injection builds up through the current injection winding, a current flows through the corresponding secondary winding having a rectifier means conducting, and the current injection builds up until the current injection reflected into said corresponding winding reaches the same amplitude and opposite polarity as the current flowing through said corresponding secondary winding, at which time the said rectifier means will be turned off After all the rectifier means form the secondary are turned off, the current injection will reflect in the primary winding discharging the parasitic capacitances across the primary switches toward zero regardless of the value of the parasitic capacitances.

Under RCIT, the current injection will always increase the amplitude until the voltage across the corresponding primary switch discharges to the level of $Vds_{(M1)x}$.

Figure 20:
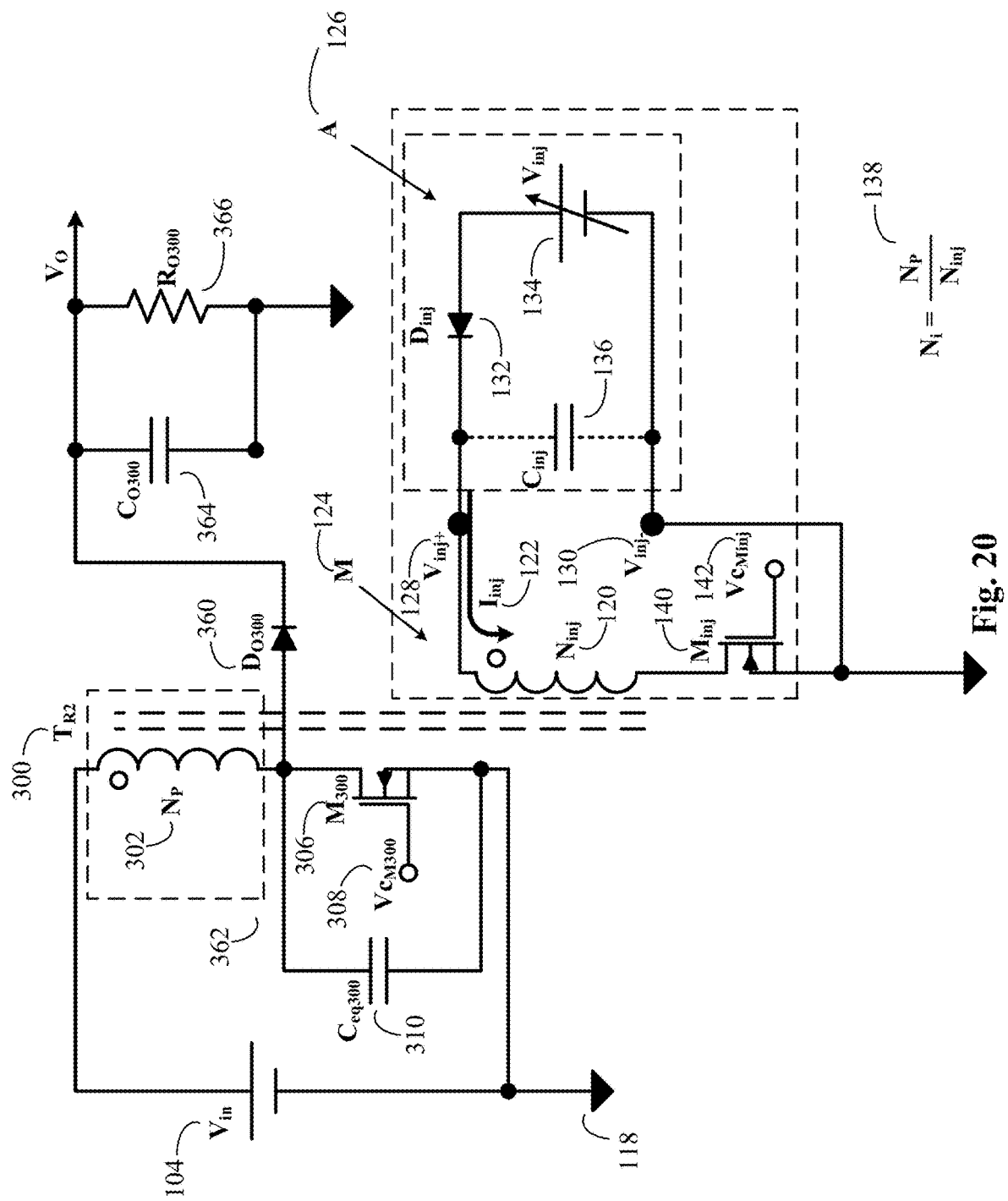
FIG. 20 a schematic representation of a boost topology using RCIT.

The embodiments presented herein do apply to all the topologies, isolated and non-isolated. The term of functional transformer is now introduced with several inclusive definitions. A functional transformer is a magnetic element with at least two windings. From the safety aspects these windings can be placed in primary and secondary or these windings can all be placed in the primary. A functional transformer does not imply that the full power processed in the transformer is sent from a winding to another winding. A functional transformer can mean that only a portion of the processed power is transferred through inductive means from a winding to another winding. FIG. 20 presents such a functional transformer. FIG. 20 presents a boost topology formed by a input voltage source, a magnetic element $T_{R2}$, 300, a main switch $M_{300}$, 306, a parasitic capacitance reflected across $M_{300}$, $C_{eq300}$, 310, a rectifier means, $D_{o300}$, 360, and an output capacitor $C_{o300}$, 364, and an output load, $R_{o300}$, 366. In the field of power conversion, the magnetic element 362, which contains winding 302 of the transformer 300, is referred as the boost inductor, or the boost choke. The role of the boost inductor is to store energy during the conduction of the main switch $M_{300}$, 306, and then transfer this energy via $D_{o300}$, 360, to the output capacitor $C_{o300}$, 362 and the output load $R_{o300}$, 366 when the $M_{300}$, 306, switch is turned off. In FIG. 20, the boost inductor is part of a functional transformer $T_{R2}$, 300. In $T_{R2}$, 300, there is also a current injection winding, 120. Most of the power processed through the inductive element, 362, is transferred to the $C_{o300}$, 364 and $R_{o300}$, 366. However, a portion of the power processed via $T_{R2}$, 300 is transferred to winding 302 from Vinj, 134, via the current injection winding 120. The transformer element $T_{R2}$ from FIG. 20 is a functional transformer, because the power transferred from winding 120 to winding 302, is just a portion of the power processed through the winding 302 which is sent to $C_{o300}$, 364, and $R_{o300}$, 364. The winding 120 is part of the current injection circuit and its main goal is to inject current into the winding 302 with the purpose of shaping the current through it and force the current through the rectifier means, $D_{o300}$ to reach zero, and further discharge the parasitic capacitance $C_{eq300}$, 310 to zero prior M300, 306, is turned on. A possible utilization of the boost topology with RCIT is in Power Factor Correction. By using RCIT, the main switch $M_{300}$ turns on at zero voltage switching regardless of the input voltage and output current.

When the boost converter operates in discontinuous mode, the current injection switch turns on at the valley during the ringing across the main switch during the dead time, so as to minimize the energy required to discharge the parasitic capacitor reflected across the main switch, $C_{eq300}$. RCIT does have the feature of self-adjusting and reducing the current injection amplitude function of the voltage wherein the main switch turns on.

In the event the boost converter operates in continuous mode, RCIT will tailor automatically the current injection amplitude to build up enough amplitude in current injection that the amplitude of the current injection reflected with the opposite polarity to the existing current in the winding 302 will exceed the value of the current flowing through the winding 302 and $D_{o300}$, 360. At the time wherein the current injection amplitude reflected into winding 302 exceeds the current flowing through $D_{o300}$, 360, the rectifier $D_{o300}$, 360, turns off at zero current level, thereby eliminating any ringing and spikes across $D_{o300}$, 360. Further, the current injection continues to flow through winding 302 discharging the parasitic capacitance reflected across $M_{300}$, 306. The current injection continues to increase until the voltage across $M_{300}$, 306, will decay to $V_{ds(M300)x} = V_{in} - N_i * V_{inj}$.

The self-adjusting feature of RCIT applied to boost topology allows zero voltage switching under any operating conditions. This feature is one advantage in Power Factor Correction circuits, wherein there is a large range of operation for input voltage and input current. Moreover, RCIT can be also used in Buck topologies operating in continuous and discontinuous mode. In discontinuous mode, the current injection is activated at the valley of the ringing across the main switch to minimize the amplitude and RMS of the current injection.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A method comprising:
providing a DC-DC converter comprising:
- a main switch;
- a transformer having a primary winding and a current injection winding, wherein a leakage inductance is formed between the primary winding and the current injection winding;
- an input voltage source;
- a primary switch connected to the primary winding;
- a parasitic capacitance reflected across the primary switch;
- a secondary rectifier means connected to the primary winding;
- a current injection circuit comprising:
  - a current injection switch connected to a first terminal of the current injection winding; and
  - a unidirectional current injection switch connected to a second terminal of the current injection winding, wherein the second terminal is not connected to the current injection switch; and
- a controlled voltage source connected to the unidirectional current injection switch and to the current injection switch at an end of the current injection switch which is not connected to the current injection winding;

switching on the current injection switch so as to start a current injection flowing from the controlled voltage source, through the unidirectional current injection switch and further through the current injection winding, wherein the current injection reflects into the primary winding with an amplitude proportional to a turn ratio of the current injection winding to the primary winding;

the current injection reflected into the primary winding discharging the parasitic capacitance reflected across the primary switch;

turning on the primary switch with a delay time after the current injection switch turns on; and turning off the current injection switch after the current injection reaches zero amplitude.

2. The method of claim 1, wherein the delay time is sufficient for the primary switch to turn on at a predetermined voltage level.

3. The method of claim 2, wherein the predetermined voltage level is zero.

4. The method of claim 1, wherein the controlled voltage source has a level which is sufficient for the primary switch to turn on at a predetermined voltage level.

5. The method of claim 4, wherein the predetermined voltage level is zero.

6. The method of claim 1, wherein the current injection switch is turned on in a valley of a voltage level during ringing across the primary switch, so as to create zero voltage switching conditions for the main switch with minimum energy consumption.

7. The method of claim 1, wherein the current injection circuit comprises part of one of a flyback topology, boost topology, and buck topology.

8. The method of claim 7, wherein the boost topology is used in a power factor correction circuit.

9. A method comprising:
providing a DC-DC converter comprising:
- a main switch;
- a transformer having a primary winding and a current injection winding, wherein a leakage inductance is formed between the primary winding and the current injection winding;
- an input voltage source;
- a primary switch connected to the primary winding;
- a parasitic capacitance reflected across the primary switch;
- a secondary rectifier means connected to the primary winding;
- a current injection circuit comprising:
  - a current injection switch connected to a first terminal of the current injection winding; and
  - a unidirectional current injection switch connected to a second terminal of the current injection winding, wherein the second terminal is not connected to the current injection switch;
- a controlled voltage source connected to the unidirectional current injection switch and to the current injection switch at an end of the current injection switch which is not connected to the current injection winding; and
- a current injection capacitor connected between the unidirectional current injection switch and the controlled voltage source;

switching on the current injection switch, so as to start a current injection flowing from the controlled voltage source, through the unidirectional current injection switch and further through the current injection winding, wherein the current injection reflects into the primary winding with an amplitude proportional to a turn ratio of the current injection winding to the primary winding;

the current injection reflected into the primary winding discharging the parasitic capacitance reflected across the primary switch;

turning on the primary switch with a delay time after the current injection switch turns on; and turning off the current injection switch after the current injection becomes negative and before it reaches zero amplitude.

10. The method of claim 9, wherein the delay time is sufficient for the primary switch to turn on at a predetermined voltage level.

11. The method of claim 10, wherein the predetermined voltage level is zero.

12. The method of claim 9, wherein the controlled voltage source has a level which is sufficient for the primary switch to turn on at a predetermined voltage level.

13. The method of claim 12, wherein the predetermined voltage level is zero.

14. The method of claim 9, wherein the current injection switch is turned on in a valley of a voltage level during ringing across the primary switch, so as to create zero voltage switching condi- tions for the main switch with minimum energy consumption.

15. The method of claim 9, wherein the current injection circuit comprises part of one of a flyback topology, boost topology, and buck topology.

16. The method of claim 15, wherein the boost topology is used in a power factor correction circuit.

17. A method comprising:
providing a DC-DC converter comprising:
- a main switch;
- a transformer having a primary winding and a current injection winding, wherein a leakage inductance is formed between the primary winding and the current injection winding;
- an input voltage source;
- a primary switch connected to the primary winding;
- a parasitic capacitance reflected across the primary switch;
- a secondary rectifier means connected to the primary winding;
- a current injection circuit comprising:
  - a current injection switch connected to a first terminal of the current injection winding; and
  - a unidirectional current injection switch connected to a second terminal of the current injection winding, wherein the second terminal not connected to the current injection switch;
  - a controlled voltage source connected to the unidirectional current injection switch and to the current injection switch at an end of the current injection switch which is not connected to the current injection winding; and
  - a current injection capacitor connected between the unidirectional current injection switch and the controlled voltage source;

switching on the current injection switch, so as to start a current injection flowing from the controlled voltage source, through the unidirectional current injection switch and further through the current injection winding, wherein the current injection reflects into the primary winding with an amplitude proportional to a turn ratio of the current injection winding to the primary winding;

wherein the current injection reflected into the primary winding has an opposite polarity of current flowing through the rectifier means and exceeds an amplitude of the current flowing through the rectifier means;

turning off the rectifier means after the current flowing through the rectifier means reaches zero;

the current injection reflected into the primary winding further discharging the parasitic capacitance reflected across the primary switch;

turning on the primary switch with a delay time after the current injection switch turns on; and turning off the current injection switch after the current injection becomes negative and before it reaches zero amplitude.

18. The method of claim 17, wherein the delay time is sufficient for the primary switch to turn on at a predetermined voltage level.

19. The method of claim 18, wherein the predetermined voltage level is zero.

20. The method of claim 17, wherein the controlled voltage source has a level which is sufficient for the primary switch to turn on at a predetermined voltage level.

21. The method of claim 20, wherein the predetermined voltage level is zero.

22. The method of claim 17, wherein the current injection circuit comprises part of one of a flyback topology, boost topology, and buck topology.

23. The method of claim 22, wherein the boost topology is used in a power factor correction circuit.

24. A method comprising:
providing a DC-DC converter comprising:
- a primary side having a main switch and a secondary side;
- a transformer having a primary winding at the primary side and two secondary windings at the secondary side, and at least two sets, wherein each set has two current injection windings, wherein a leakage inductance is formed between the primary winding and each of the two current injection windings in each set and also between the secondary windings and each of the two current injection windings in each set;
- an input voltage source;
- two primary switches connected to the primary winding;
- a parasitic capacitance reflected across each of the two primary switches;
- two secondary rectifier means, each connected to a respective one of the two secondary windings;
- a current injection circuit comprising:
  - two current injection switches in each set, each connected to a first terminal of a respective one of the two current injection windings; and
  - two unidirectional current injection switches in each set, each connected to a second terminal of the respective one of the two current injection windings, wherein the second terminals are not connected to the current injection switches;
  - two controlled voltage sources in each set, each connected to the respective unidirectional current injection switches and to each current injection switch at ends of the current injection switches which are not connected to the current injection windings;
  - two current injection capacitors in each set, each connected between the respective unidirectional current injection switches and the controlled voltage sources;

each current injection switch in each set has a corresponding rectifier means, wherein curre2t injection flowing through each of the current injection switches produces induced currents in the secondary windings connected to the corresponding rectifier means of opposite polarity to currents flowing through the corresponding rectifier means; and each current injection switch in each set has a corresponding primary switch, wherein current injection flowing through each of the current injection switches produces an induced current in the primary winding connected to the corresponding primary switch of opposite polarity to the current flowing through corresponding primary switch;

switching on each of the current injection switches in each set, so as to start a current injection flowing from the controlled voltage source, through the respective unidirectional current injection switch and further through the respective current injection winding, wherein the current injection reflects into the secondary winding connected to the corresponding rectifier means with an amplitude proportional to a turn ratio of the current injection winding to the secondary winding connected to the corresponding rectifier means;

the current injection reflected into the secondary winding connected to the corresponding rectifier means has an opposite polarity of current flowing through the corresponding rectifier means and exceeds the amplitude of the current flowing through the corresponding rectifier means;

turning off the rectifier means after the current through the rectifier means reaches zero;

the current injection further reflects into the primary winding with an amplitude proportional to a turn ratio of the current injection winding to the primary winding;

the current injection reflected into the primary winding discharging the parasitic capacitances reflected across the primary switches;

turning on the respective corresponding primary switches with a delay time after the corresponding current injection switch turns on; and turning off the current injection switches after the current injection becomes negative and before it reaches zero amplitude.

25. The method of claim 24, wherein the delay time is sufficient for the primary switches to turn on at a predetermined voltage level.

26. The method of claim 25, wherein the predetermined voltage level is zero.

27. The method of claim 24, wherein the controlled voltage source has a level which is sufficient for the primary switches to turn on at a predetermined voltage level.

28. The method of claim 27, wherein the predetermined voltage level is zero.

29. The method of claim 24, wherein the current injection circuits comprise a part of one of a half bridge topology, full bridge topology, and two transistor forward topology.

* * * * *